(12) United States Patent
Song et al.

(10) Patent No.: US 12,176,940 B2
(45) Date of Patent: Dec. 24, 2024

(54) TRANSCEIVER DEVICE, DISPLAY SYSTEM INCLUDING THE SAME, AND METHOD OF DRIVING TRANSCEIVER DEVICE

(71) Applicant: SAMSUNG DISPLAY CO., LTD., Yongin-si (KR)

(72) Inventors: Jun Yong Song, Yongin-si (KR); Hyun Su Kim, Yongin-si (KR); Dong Won Park, Yongin-si (KR); Jong Man Bae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/973,960

(22) Filed: Oct. 26, 2022

(65) Prior Publication Data

US 2023/0318654 A1    Oct. 5, 2023

(30) Foreign Application Priority Data

Apr. 1, 2022  (KR) .......................... 10-2022-0041348

(51) Int. Cl.
*H04B 1/40* (2015.01)
*H04L 7/04* (2006.01)

(52) U.S. Cl.
CPC .................... *H04B 1/40* (2013.01); *H04L 7/04* (2013.01)

(58) Field of Classification Search
CPC ..................................... H04B 1/40; H04L 7/04
USPC ........................................................ 713/501
See application file for complete search history.

(56) References Cited

U.S. PATENT DOCUMENTS

| | | | | |
|---|---|---|---|---|
| 3,701,948 A | * | 10/1972 | McAuliffe | H04L 27/066 375/321 |
| 5,386,518 A | * | 1/1995 | Reagle | G06F 13/385 710/316 |
| 6,275,499 B1 | * | 8/2001 | Wynn | H04Q 11/0478 370/907 |
| 6,388,591 B1 | * | 5/2002 | Ng | G06F 3/0676 710/60 |
| 7,106,862 B1 | * | 9/2006 | Blair | H04J 3/1652 380/42 |
| 7,176,763 B2 | | 2/2007 | Park | |
| 7,190,931 B2 | | 3/2007 | Casper et al. | |
| 8,237,699 B2 | | 8/2012 | Hong et al. | |

(Continued)

FOREIGN PATENT DOCUMENTS

| | | |
|---|---|---|
| EP | 4105774 A1 | 12/2022 |
| EP | 4109233 A1 | 12/2022 |

(Continued)

*Primary Examiner* — Paul R. Myers
(74) *Attorney, Agent, or Firm* — CANTOR COLBURN LLP

(57) ABSTRACT

A transceiver device includes a transmitter and a receiver connected to each other through a first line and a second line. The transmitter transmits signals having a first voltage range to the first line and the second line in a first mode, and transmits signals having a second voltage range less than the first voltage range to the first line and the second line in a second mode. The transmitter encodes an original payload to generate a first payload in the second mode, and transmits a clock training pattern and the first payload through the first line and the second line. The receiver decodes the first payload and outputs reception data corresponding to the original payload in the second mode.

19 Claims, 12 Drawing Sheets

(56) References Cited

U.S. PATENT DOCUMENTS

| | | |
|---|---|---|
| 8,611,484 B2 | 12/2013 | Jeon et al. |
| 8,755,480 B1* | 6/2014 | Leong .................. H04L 7/005 |
| | | 375/376 |
| 9,466,263 B2 | 10/2016 | Bae et al. |
| 9,735,950 B1 | 8/2017 | Liu et al. |
| 10,313,100 B2 | 6/2019 | Yim |
| 10,319,286 B2 | 6/2019 | Do et al. |
| 10,516,400 B2 | 12/2019 | Huh et al. |
| 10,587,491 B1 | 3/2020 | Volpe |
| 10,649,946 B1* | 5/2020 | Brett .................. G06F 1/3296 |
| 10,657,875 B2 | 5/2020 | Chung et al. |
| 10,726,808 B2 | 7/2020 | Han et al. |
| 10,796,661 B2 | 10/2020 | Park |
| 10,943,559 B2 | 3/2021 | Park |
| 11,677,536 B2 | 6/2023 | Kim et al. |
| 2003/0085736 A1* | 5/2003 | Tinsley .................. H04L 25/028 |
| | | 326/81 |
| 2004/0263214 A1* | 12/2004 | Patterson .......... H04L 25/0274 |
| | | 327/65 |
| 2005/0119025 A1* | 6/2005 | Mohindra ............ H04B 1/0021 |
| | | 455/88 |
| 2005/0168244 A1* | 8/2005 | Wijeratne ........ H03K 19/01855 |
| | | 326/93 |
| 2007/0297552 A1 | 12/2007 | Bae et al. |
| 2008/0189455 A1* | 8/2008 | Dreps .................. G06F 13/1694 |
| | | 710/106 |
| 2008/0267267 A1* | 10/2008 | Lee .................. H04L 25/0272 |
| | | 375/257 |
| 2009/0052600 A1* | 2/2009 | Chen .................. H04L 25/0272 |
| | | 375/359 |
| 2009/0167750 A1* | 7/2009 | Hong .................. G09G 3/2096 |
| | | 345/213 |
| 2010/0091921 A1 | 4/2010 | Den Besten et al. |
| 2010/0220748 A1 | 9/2010 | Inomata |
| 2012/0063534 A1* | 3/2012 | Lin .................. H04L 7/033 |
| | | 327/155 |
| 2012/0115952 A1 | 8/2012 | Werner et al. |
| 2013/0093466 A1 | 4/2013 | Lee et al. |
| 2014/0118235 A1* | 5/2014 | Hong .................. G09G 5/008 |
| | | 345/87 |
| 2015/0103038 A1* | 4/2015 | Han .................. G06F 3/0443 |
| | | 345/98 |
| 2015/0187293 A1* | 7/2015 | Yoo .................. G09G 3/3607 |
| | | 345/694 |
| 2015/0195211 A1 | 7/2015 | Sengoku |
| 2015/0229467 A1 | 8/2015 | Lee et al. |
| 2016/0056859 A1* | 2/2016 | Malhotra ............. H04B 3/238 |
| | | 375/356 |
| 2016/0299870 A1 | 10/2016 | Mitric et al. |
| 2019/0197979 A1* | 6/2019 | Kim .................. G09G 3/3685 |
| 2019/0319629 A1* | 10/2019 | Lee .................. G11C 7/222 |
| 2021/0118356 A1 | 4/2021 | Lim et al. |
| 2022/0198989 A1* | 6/2022 | Park .................. G09G 5/008 |
| 2022/0397931 A1 | 12/2022 | Song et al. |
| 2022/0399915 A1* | 12/2022 | Kim .................. H04L 5/0053 |
| 2023/0327845 A1 | 10/2023 | Kim et al. |

FOREIGN PATENT DOCUMENTS

| | | |
|---|---|---|
| KR | 100574980 B1 | 4/2006 |
| KR | 1020080011527 A | 2/2008 |
| KR | 1020100092562 A | 8/2010 |
| KR | 101671018 B1 | 10/2016 |
| KR | 1020180049285 A | 5/2018 |
| KR | 101938674 B1 | 1/2019 |
| KR | 1020190052186 A | 5/2019 |
| KR | 1020190055466 A | 5/2019 |
| KR | 102071573 B1 | 1/2020 |
| KR | 1020200024984 A | 3/2020 |
| KR | 1020200041406 A | 4/2020 |

\* cited by examiner

TRANSCEIVER DEVICE, DISPLAY SYSTEM INCLUDING THE SAME, AND METHOD OF DRIVING TRANSCEIVER DEVICE

This application claims priority to Korean Patent Application No. 10-2022-0041348, filed on Apr. 1, 2022, and all the benefits accruing therefrom under 35 U.S.C. § 119, the content of which in its entirety is herein incorporated by reference.

BACKGROUND

1. Field

The disclosure relates to a transceiver device, a display system including the same, and a method of driving the transceiver device.

2. Description of the Related Art

As an information technology is developed, importance of a display device that is a connection medium between a user and information is emphasized. In response to this, a use of a display device such as a liquid crystal display device and an organic light emitting display device is increasing.

In general, a display device may perform internal communication using a mobile industry processor interface (MIPI) protocol.

SUMMARY

In a MIPI protocol, a clock lane (for example, a clock line) may be separately used, such that physical/spatial cost may increase and power consumption may increase.

An embodiment of the disclosure to provide a transceiver device including a receiver that improves a difference between the number of bits of encoded data including an encoding key and the number of bits of data obtained by decoding the encoded data.

Another embodiment of the disclosure is to provide a method of driving the transceiver device.

Still another embodiment of the disclosure is to provide a display system including the transceiver device.

According to embodiments of the disclosure, a transceiver device includes a transmitter and a receiver connected to each other through a first line and a second line. In such embodiments, the transmitter transmits signals having a first voltage range to the first line and the second line in a first mode, and transmits signals having a second voltage range less than the first voltage range to the first line and the second line in a second mode. In such embodiments, the transmitter encodes an original payload to generate a first payload in the second mode, and transmits a clock training pattern and the first payload through the first line and the second line in the second mode. In such embodiments, the receiver decodes the first payload and output reception data corresponding to the original payload in the second mode.

According to an embodiment, the first line and the second line may be used in a single-ended scheme in the first mode, and the first line and the second line may be used in a differential scheme in the second mode.

According to an embodiment, the transmitter may encode the original payload into the first payload including an encoding key, and the receiver may provide the reception data through decoding by which the encoding key is removed from the first payload.

According to an embodiment, the receiver may mask an RX clock signal for transmission of the first payload during a reception masking period.

According to an embodiment, the receiver may include a data receiver which transmits the first payload from the first line and the second line based on the RX clock signal, a decoder which decodes the first payload provided from the data receiver into the reception data, a clock counter which counts the RX clock signal and generates an RX clock control signal in response to a preset count value, a clock controller which masks a portion of the RX clock signal based on the RX clock control signal and outputs an RX byte clock signal, which is generated by masking the portion of the RX clock signal based on the RX clock control signal, and a reception controller which receives the reception data from the decoder in synchronization with the RX byte clock signal.

According to an embodiment, the RX byte clock signal may be output at a gate-off level during the reception masking period.

According to an embodiment, an output of the reception data to the reception controller may be held during the reception masking period.

According to an embodiment, the first payload may be provided to the decoder in synchronization with a gate-on level of the RX clock signal, and the reception data may be provided to the reception controller in synchronization with a gate-on level of the RX byte clock signal.

According to an embodiment, the data receiver may include a clock data restorer which generates the RX clock signal based on the clock training pattern and the first payload.

According to an embodiment, the transmitter may mask a TX clock signal for transmission of the first payload during a transmission masking period.

According to an embodiment, the transmitter may include a transmission controller which transmits the original payload based on the TX clock signal and generates a first transmission request signal in the second mode, a data transmitter which generates the TX clock signal and transmits the clock training pattern and the first payload to the first line and the second line, an encoder which encodes the original payload provided from the transmission controller into the first payload including the encoding key, and transmits the clock training pattern to the data transmitter in response to the first transmission request signal, a clock counter which counts the TX clock signal and generates a TX clock control signal in response to a preset count value, and a clock controller which masks a portion of the TX clock signal based on the TX clock control signal and provides a TX clock signal, which is generated by masking the portion of the TX clock signal based on the TX clock control signal, to the transmission controller and the encoder.

According to an embodiment, the modified TX clock signal may be output at a gate-off level during the transmission masking period, and an input of the original payload to the encoder may be held during the transmission masking period.

According to an embodiment, the original payload may be provided to the encoder in synchronization with a gate-on level of the modified TX clock signal, and the first payload may be provided to the data transmitter in synchronization with the gate-on level of the TX clock signal.

According to an embodiment, in the second mode, the encoder may further generate a start pattern transmitted between the clock training pattern and the first payload, and may further generate an end pattern transmitted after the first payload.

According to an embodiment, the data transmitter may sequentially transmit an HS-zero pattern and an HS-sync pattern before transmitting the clock training pattern, and may sequentially transmit an HS-trail pattern and an HS-exit pattern after transmitting the end pattern.

According to embodiments of the disclosure, a method of driving a transceiver device including a transmitter and a receiver connected to each other through a first line and a second line includes transmitting signals having a first voltage range from the transmitter to the receiver in a first mode, and transmitting signals having a second voltage range, which is less than the first voltage range, from the transmitter to the receiver in a second mode. Transmitting the signals having the second voltage range may include transmitting a clock training pattern from the transmitter to the receiver through the first line and the second line, generating a first payload by encoding an original payload using an encoder included in the transmitter and transmitting the first payload from the transmitter to the receiver through the first line and the second line, generating an RX clock signal of the receiver based on the clock training pattern and the first payload, and providing reception data corresponding to the original payload by decoding the first payload using a decoder included in the receiver.

According to an embodiment, the transmitting the first payload may include counting a TX clock signal of the transmitter to mask a portion of the TX clock signal, inputting the original payload to the encoder based on a modified TX clock signal, which is generated by masking the portion of the TX clock signal, encoding the original payload into the first payload using an encoding key, and outputting the first payload from the encoder based on the TX clock signal.

According to an embodiment, the providing the reception data may include inputting the first payload to a decoder based on the RX clock signal, generating an RX byte clock signal, which is generated by masking a portion of the RX clock signal by counting the RX clock signal, decoding the first payload to generate the reception data, and outputting the reception data in synchronization with the RX byte clock signal.

According to an embodiment, the RX byte clock signal may be output at a gate-off level during a reception masking period, and the modified TX clock signal may be output at a gate-off level during a transmission masking period.

According to embodiments of the disclosure, a display system includes a processor which outputs image data, a display module which displays an image based on the image data, and a transceiver device which is in charge of data transmission and reception between the processor and the display module. In such embodiments, the transceiver device includes a transmitter and a receiver connected to each other through a first line and a second line.

In such embodiments, the transmitter transmits signals having a first voltage range to the first line and the second line in a first mode, and transmits signals having a second voltage range less than the first voltage range to the first line and the second line in a second mode. The transmitter may encode an original payload to generate a first payload in the second mode, and transmit a clock training pattern and the first payload through the first line and the second line.

In such embodiments, the receiver includes a decoder which decodes the first payload and output reception data corresponding to the original payload in the second mode. In such embodiments, the receiver generates an RX clock signal based on the clock training pattern and the first payload.

In such an embodiments, the first payload is input to the decoder in synchronization with the RX clock signal, and the reception data is output from the decoder in synchronization with an RX byte clock signal in which a portion of the RX clock signal is masked.

In embodiments, a transceiver device may perform data communication through data including clock information using an MIPI protocol without using a clock line. Therefore, since a line for clock is removed, a space and a cost required for the line for clock may be reduced, and power consumption may also be reduced.

In embodiments, the transmitter may periodically mask a TX clock signal, and the receiver may periodically mask an RX clock signal to prevent or minimize a data communication error due to a difference of data input/output processing time for the same valid data in an encoder of a transmitter and a decoder of a receiver due to data overhead. Therefore, a data input processing frequency and a data output processing frequency of the encoder may become substantially equal to (or be synchronized with) each other, and a data input processing frequency and a data output processing frequency of the decoder may become substantially equal to (or be synchronized with) each other. Accordingly, integrity of data transmission and reception may be maintained.

In such embodiments, by improving the integrity of the data transmission and reception only by masking an internal clock signal without additional generation of a clock signal or using a memory, an increase of circuit complexity may be minimized and a cost may be reduced.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
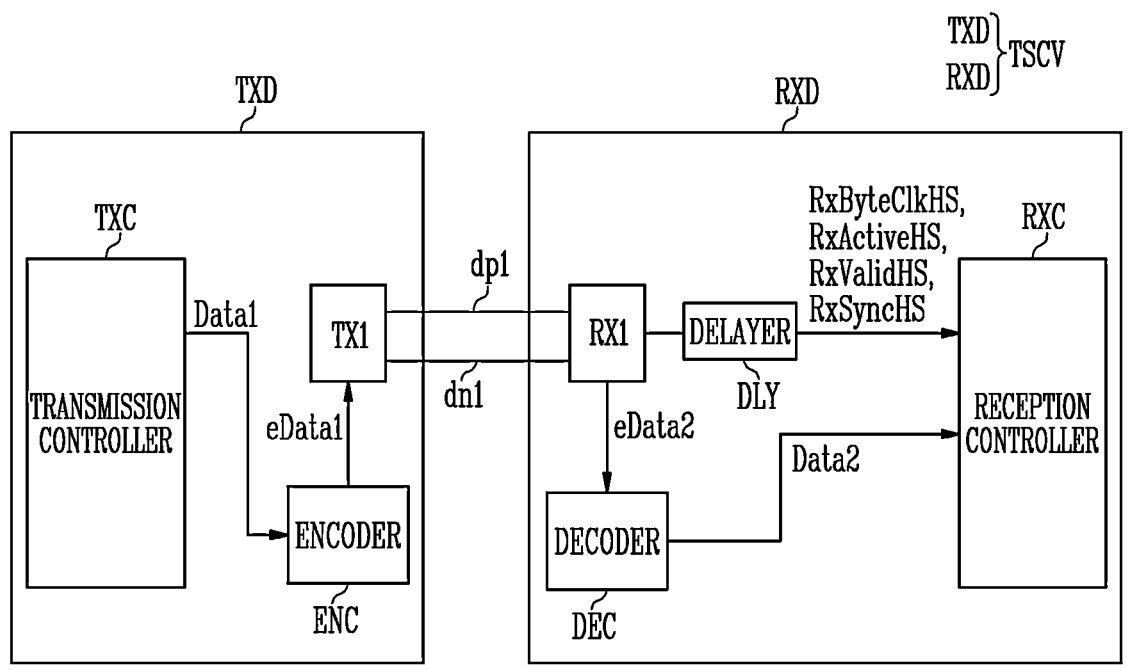
FIGS. 1 and 2 are block diagrams illustrating transceiver device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Since the embodiment described in the present specification is for clearly describing the spirit of the disclosure to those skilled in the art to which the disclosure pertains, the disclosure is not limited by the embodiment described in the present specification, and the scope of the disclosure should be interpreted as including modifications or variations that do not depart from the spirit of the disclosure.

The drawings attached to the present specification are intended to easily describe the disclosure. Since the shape shown in the drawings may be exaggerated and displayed as necessary to help understanding of the disclosure, the disclosure is not limited by the drawings.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the disclosure will be described in detail with reference to the accompanying drawings.

Figure 2:
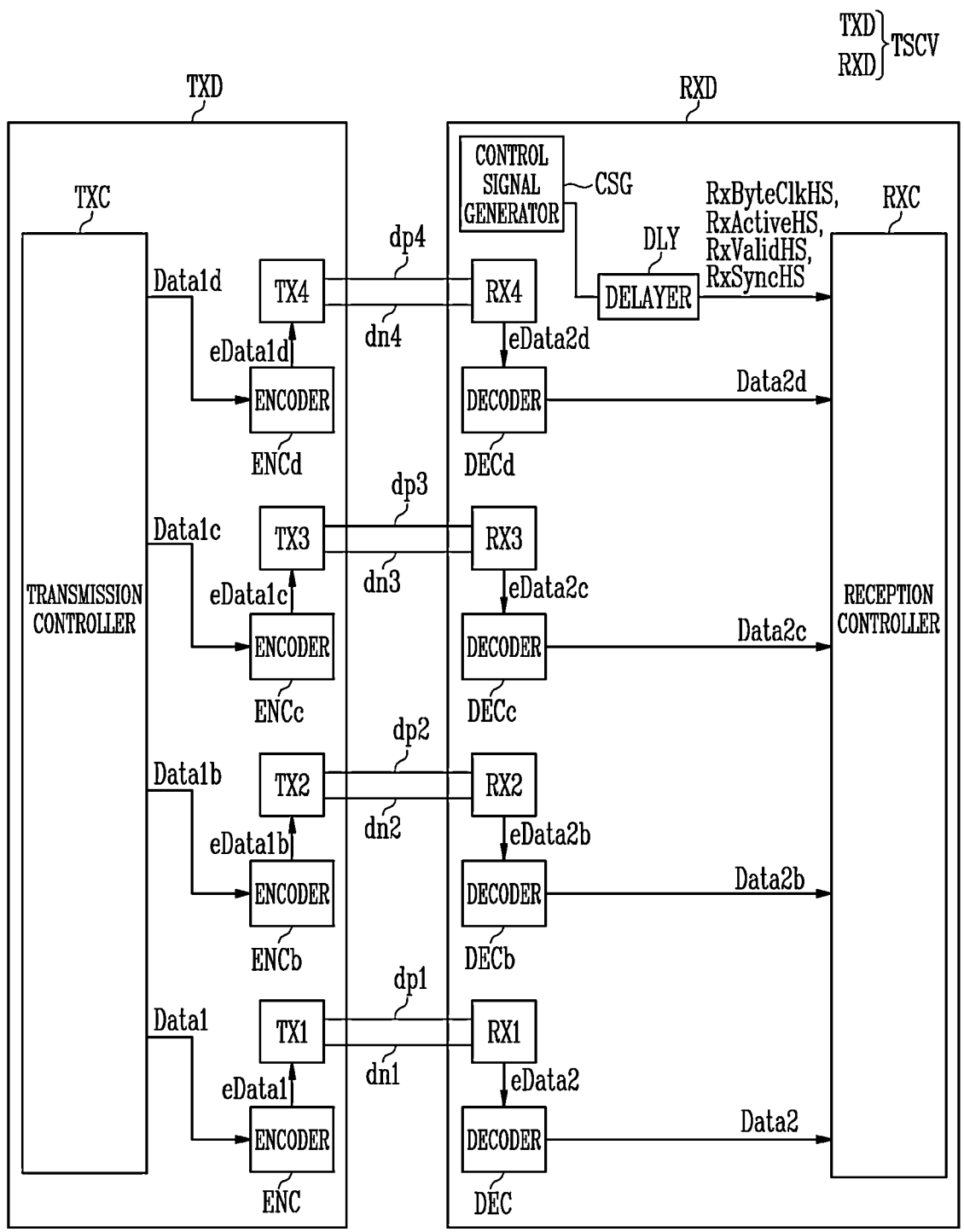

FIGS. 1 and 2 are block diagrams illustrating transceiver device according to embodiments of the disclosure.

Referring to FIGS. 1 and 2, an embodiment of a transceiver device TSCV may include a transmitter TXD and a receiver RXD.

The transmitter TXD may include a transmission controller TXC (for example, a transmission link module), a first data transmitter TX1 (for example, a transmission D-PHY module), and an encoder ENC. The receiver RXD may include a reception controller RXC (for example, a reception link module), a first data receiver RX1 (for example, a reception D-PHY module), and a decoder DEC. The receiver RXD may further include a delayer DLY.

The first data transmitter TX1 may be connected to the first data receiver RX1 through a first line dp1 and a second line dn1. The first data transmitter TX1 and the first data receiver RX1 may be referred to as a first data channel.

The first data transmitter TX1 and the first data receiver RX1 may correspond to a physical layer and a data link layer of an OSI 7 layer model, may correspond to a network interface of a TCP/IP protocol, or may correspond to a physical layer of a mobile industry processor interface (MIPI) protocol. The physical layer of the MIPI protocol may be configured according to various predetermined specifications, such as D-PHY, C-PHY, and M-PHY.

The transmission controller TXC and the reception controller RXCr may correspond to a network layer and a transport layer of the OSI 7 layer model, may correspond to the Internet and transport of the TCP/IP protocol, or may correspond to a protocol layer of the MIPI protocol. The protocol layer of the MIPI protocol may be configured according to various predefined specifications such as a display serial interface (DSI) and a camera serial interface (CSI).

Hereinafter, embodiments where the first data transmitter TX1 and the first data receiver RX1 are configured according to the D-PHY specification among the physical layers of the MIPI protocol, and the transmission controller TXC and the reception controller RXC are configured according to the DSI specification among the protocol layers of the MIPI protocol will be described. However, the first data transmitter TX1, the first data receiver RX1, the transmission controller TXC, and the reception controller RXC are not limited thereto, and may be applied to interfaces of various standards.

In an embodiment, the transmission controller TXC, the first data transmitter TX1, and the encoder ENC may be configurations separately from each other in hardware, or may be configurations in which two or more thereof are integrated with each other in hardware. In an embodiment, the transmission controller TXC, the first data transmitter TX1, and the encoder ENC may be configurations separately from each other in software, or may be configurations in which two or more are integrated in software. In an embodiment, the transmitter TXD may be configured as a portion (hardware or software) of a predetermined processing device (for example, an application processor (AP), a graphics processing unit (GPU), a central processing unit (CPU), or the like), or may be configured as independent hardware (for example, a transmission dedicated IC).

In an embodiment, the reception controller RXC, the first data receiver RX1, the decoder DEC, and the delayer DLY may be configurations separately from each other in hardware, or may be configurations in which two or more thereof are integrated with each other in hardware. In an embodiment, the reception controller RXC, the first data receiver RX1, the decoder DEC, and the delayer DLY may be configurations separately from each other in software, or may be configurations in which two or more are integrated in software. In an embodiment, the receiver RXD may be configured as a portion (hardware or software) of a predetermined device (for example, a timing controller (TCON), a TCON embedded driver IC (TED), a driver IC (D-IC), or the like), or may be configured as independent hardware (for example, a reception dedicated IC).

The transmission controller TXC may provide first data Data1 including an original payload Payload (shown in FIG. 3) to the encoder ENC. The encoder ENC may encode the first data Data1 to generate first encoded data eData1 including a first payload ePayload (or an encoded payload) (shown in FIG. 3), and provide the first encoded data eData1 to the first data transmitter TX1. The first data transmitter TX1 may transmit other data by adding the other data before and after the first encoded data eData1 according to a predetermined protocol.

In an embodiment, the first data receiver RX1 may generate an internal clock signal using the first encoded data eData1 and sample data received through the first line dp1 and the second line dn1 based on the generated internal clock signal. In an embodiment, for example, the first data receiver RX1 may include a clock data restoration circuit.

The first data receiver RX1 may provide second encoded data eData2 including substantially the same first payload as the first encoded data eData1 to the decoder DEC.

The decoder DEC may decode the second encoded data eData2 to generate second data Data2 including the same payload (for example, a payload the same as the original payload) as the first data Data1, and provide the second data Data2 to the reception controller RXC.

In an embodiment, the first data receiver RX1 may generate a plurality of signals RxActiveHS, RxValidHS, and RxSyncHS used according to a protocol applied to the transceiver device TSCV. In such an embodiment, the delayer DLY may delay the signals RxActiveHS, RxValidHS, and RxSyncHS by a decoding time and provide the signals RxActiveHS, RxValidHS, and RxSyncHS to the reception controller RXC. The decoding time may be a time spent for the decoder DEC to decode the second encoded data eData2 to generate the second data Data2.

According to an embodiment, the transceiver device TSCV may be configured of or defined by one data channel as shown in FIG. 1, but not being limited thereto. Alternatively, the transceiver device TSCV may be configured of a plurality of data channels (for example, four data channels) as shown in FIG. 2.

In an embodiment, as shown in FIG. 2, the transmitter TXD may further include second to fourth data transmitters TX2, TX3, and TX4 and corresponding encoders ENCb, ENCc, and ENCd. The receiver RXD may include second to fourth data receivers RX2, RX3, and RX4 and corresponding decoders DECb, DECc, and DECd. In such an embodiment, the receiver RXD may further include a control signal generator CSG and the delayer DLY.

The second data transmitter TX2 may be connected to the second data receiver RX2 through a first line dp2 and a second line dn2. The second data transmitter TX2 and the second data receiver RX2 may be referred to as a second data channel. The third data transmitter TX3 may be connected to the third data receiver RX3 through a first line dp3 and a second line dn3. The third data transmitter TX3 and the third data receiver RX3 may be referred to as a third data channel. The fourth data transmitter TX4 may be connected to the fourth data receiver RX4 through a first line dp4 and a second line dn4. The fourth data transmitter TX4 and the fourth data receiver RX4 may be referred to as a fourth data channel. The plurality of data channels may transmit and receive data independent of each other.

Since an operation of the encoders ENCb, ENCc, and ENCd that encode data Data1$b$, Data1$c$, and Data1$d$ to generate encoded data eData1$b$, eData1$c$, and eData1$d$ is substantially the same as an operation of the encoder ENC described above with reference to FIG. 1, any repetitive detailed description thereof will be omitted.

Since an operation of the decoders DECb, DECc, and DECd that decode encoded data eData2$b$, eData2$c$, and eData2$d$ to generate data Data2$b$, Data2$c$, and Data2$d$ is substantially the same as an operation of the decoder DEC described above with reference to FIG. 1, any repetitive detailed description thereof will be omitted.

The control signal generator CSG may generate control signals RxActiveHS, RxValidHS, RxSyncHS, and RxByteClkHS using the data received by the first to fourth data receivers RX1, RX2, RX3, and RX4. In an embodiment, for example, the control signal generator CSG may align a timing of the data received by the first to fourth data receivers RX1, RX2, RX3, and RX4, and generate the control signals RxActiveHS, RxValidHS, RxSyncHS, and RxByteClkHS based on the aligned data.

The delayer DLY may delay at least one selected from the control signals RxActiveHS, RxValidHS, RxSyncHS, and RxByteClkHS by a decoding time and provide the at least one selected from the control signals RxActiveHS, RxValidHS, RxSyncHS, and RxByteClkHS to the reception controller RXC. Here, the decoding time may be a time spent for the decoders DEC, DECb, DECc, and DECd to decode the second encoded data eData2, eData2$b$, eData2$c$, and eData2$d$ to generate the second data Data2, Data2$b$, Data2$c$, and Data2$d$. In an embodiment, for example, where the decoding times of the decoders DEC, DECb, DECc, and DECd are different from each other, the delayer DLY may delay an output of at least one selected from the control signals RxActiveHS, RxValidHS, RxSyncHS, and RxByteClkHS based on the slowest decoding time.

In an embodiment, as described above, a clock line connected between the transmitter TXD and the receiver RXD may be omitted (removed) in the transceiver device TSCV for communicating based on the MIPI protocol. In such an embodiment, clock information (or information on a clock signal) may be included (embedded) in the encoded data (for example, eData1, eData1$b$, eData1$c$, and eData1$d$) supplied to the first and second lines dp1 and dn1. Therefore, physical/spatial cost and power consumption due to clock line disposition may be reduced.

Figure 3:
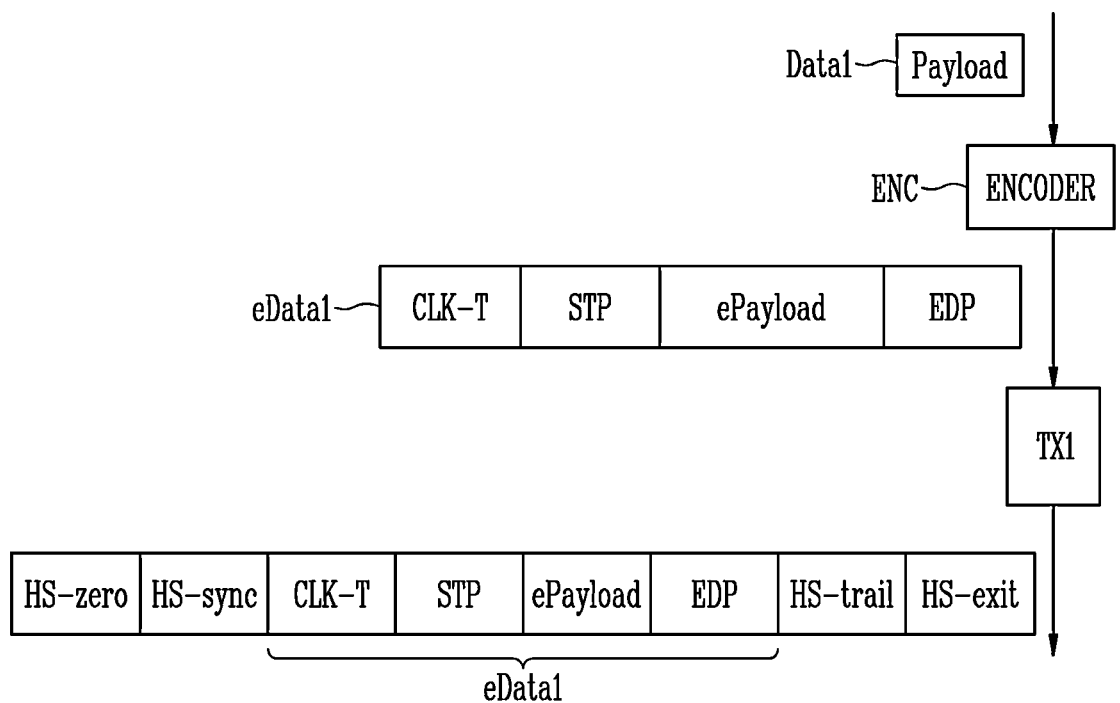
FIGS. 3 and 4 are diagrams illustrating an embodiment of an operation of a transmitter included in the transceiver device of FIGS. 1 and 2.
Figure 4:
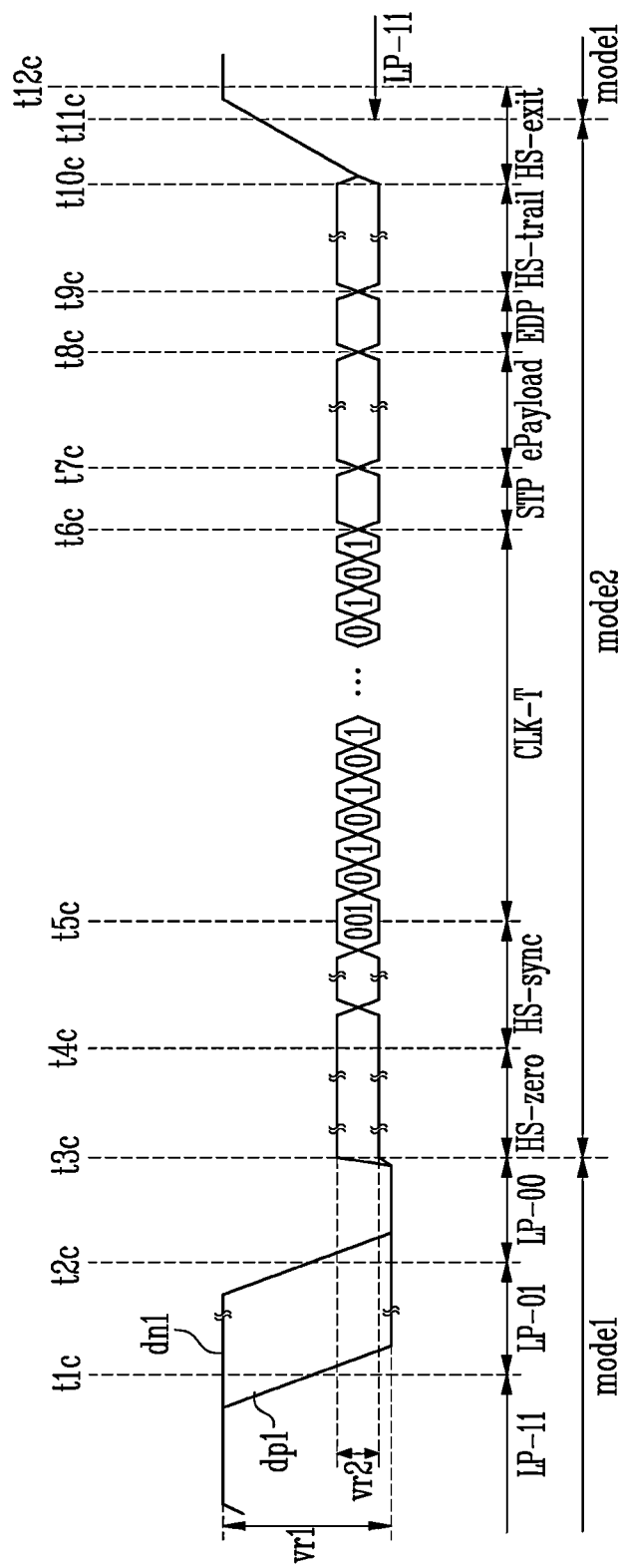

FIGS. 3 and 4 are diagrams illustrating an embodiment of the operation of the transmitter included in the transceiver device of FIGS. 1 and 2.

Referring to FIGS. 1, 2, 3, and 4, an embodiment of the transmitter TXD may transmit data through the first and second lines dp1 and dn1 by adding other data before and after the original payload Payload according to a predetermined protocol.

The encoder ENC may receive the first data Data1 including the original payload Payload. The encoder ENC may encode the original payload Payload to generate the first payload ePayload (or the encoded payload), and add data before and after the first payload ePayload to generate the first encoded data eData1. In an embodiment, for example, the first encoded data eData1 may sequentially include a clock training pattern CLK-T, a start pattern STP, the first payload ePayload, and an end pattern EDP.

The clock training pattern CLK-T may include frequency information of clock information. The clock training pattern CLK-T may be data used to restore the clock signal in the receiver RXD. The receiver RXD may generate the clock signal having a specific frequency and a specific phase by using the clock information.

In an embodiment, for example, as shown in FIG. 4, the clock training pattern CLK-T may be a pattern in which 1 and 0 are repeated alternately with each other (for example, 01010101 . . . ). A frequency and a phase of the clock signal generated by a clock data restoration circuit (or a clock data restorer) of the receiver RXD may be undesirably changed by an external factor (noise, temperature, or the like). The receiver RXD may correct the frequency and the phase of the clock signal using the clock training pattern CLK-T.

In an alternative embodiment, the clock training pattern CLK-T may repeatedly include a plurality of successive 0s and a plurality of successive 1s. In an embodiment, for example, frequency information and phase information indicated by the clock training pattern CLK-T may vary according to the number of plurality of successive 0s or the number of plurality of successive 1s.

The start pattern STP may be a pattern informing a transmission start of the first payload ePayload. The start pattern STP may be a pattern that the first payload ePayload which is in an encoded state may not include (=use inhibited). In an embodiment, for example, the start pattern STP may be configured as 24b' (24 bits), e.g., 011100_000000_111111_110001'.

The first payload ePayload may further include the clock information. In a case, where there are many successive 0s or many successive 1s in the original payload Payload, since transition of a signal may be small, a phase correction of the clock signal based on clock training may not be sufficiently performed in the first data receiver RX1, and a skew of the clock signal may occur by the clock training. Therefore, the encoder ENC may encode the original payload Payload so that the number of transitions (a change from 0 to 1 or a change from 0 to 1) of the first payload ePayload is sufficiently great compared to the original payload Payload. In an embodiment, the encoder ENC may perform encoding so that the first payload ePayload periodically has a bit of a specific rule.

The end pattern EDP may be a pattern informing a transmission end of the first payload ePayload. The end pattern EDP may be a pattern that the first payload ePayload which is in the encoded state may not include (=use inhibited). In an embodiment, for example, the end pattern EDP may be configured as 24b' (24 bits), e.g., 011100_111111_000000_110001'.

The first data transmitter TX1 may receive the first encoded data eData1 including the first payload ePayload. The first data transmitter TX1 may transmit other data by adding the other data before and after the first encoded data eData1 according to a predetermined protocol. In an embodiment, for example, where the predetermined protocol is the MIPI protocol, the first data transmitter TX1 may sequentially transmit the first pattern HS-zero, the second pattern HS-sync, the first encoded data eData1, the third pattern HS-trail, and the fourth pattern HS-exit.

In an embodiment, as shown in FIG. 4, the transmitter TXD (in particular, the first data transmitter TX1) may transmit signals having a first voltage range vr1 to the first line dp1 and the second line dn1 in a first mode mode1. The transmitter TXD may transmit signals having a second voltage range vr2 less than the first voltage range vr1 to the first line dp1 and the second line dn1 in a second mode mode2. In an embodiment, for example, the first mode mode1 may be a low-power mode, and the second mode mode2 may be a high-speed transmission mode.

In the first mode mode1, the first line dp1 and the second line dn1 may be used in a single-ended scheme. That is, the signals transmitted to each of the first line dp1 and the second line dn1 in the first mode mode1 may be the same as or different from each other.

In the second mode mode2, the first line dp1 and the second line dn1 may be used in a differential scheme. That is, the signals transmitted to each of the first line dp1 and the second line dn1 in the second mode mode2 are different from each other.

The transmitter TXD may transmit the clock training pattern CLK-T and the first payload ePayload in the second mode mode2.

In an embodiment, the transmitter TXD may transmit the predefined patterns (for example, a pattern LP-11, a pattern LP-01, and a pattern LP-00 in FIG. 4) to the first line dp1 and the second line dn1 to inform a switch from the first mode mode1 to the second mode mode2.

In an embodiment, for example, the transmitter TXD may maintain the signals applied to the first line dp1 and the second line dn1 as a logic high level before a first time point t1c (the pattern LP-11).

Through the first time point t1c, the transmitter TXD may change the signal of the first line dp1 to a logic low level and maintain the signal of the second line dn1 as the logic high level (that is, the pattern LP-01). Next, after a second time point t2c, the transmitter TXD may maintain the signal of the first line dp1 as the logic low level and change the signal of the second line dn1 to the logic low level (that is, the pattern LP-00).

Thereafter, in the second mode mode2, the transmitter TXD may sequentially transmit the first pattern HS-zero, the second pattern HS-sync, the first encoded data eData1, the third pattern HS-trail, and the fourth pattern HS-exit. In an embodiment, for example, the transmitter TXD may transmit the first pattern HS-zero during a period from a third time point t3c to a fourth time point t4c, transmit the second pattern HS-sync during a period from the fourth time point t4c to a fifth time point t5c, and transmit the clock training pattern CLK-T during a period from the fifth time point t5c to a sixth time point t6c.

In addition, the transmitter TXD may transmit the start pattern STP during a period from the sixth time point t6c to a seventh time point t7c, transmit the first payload ePayload during a period from a seventh time point t7c to an eighth time point t8c, and transmit the end pattern EDP during a period from the eighth time point t8c to a ninth time point t9c.

Thereafter, the transmitter TXD may transmit the third pattern HS-trail during a period from the ninth time point t9c to a tenth time point t10c, and transmit the fourth pattern HS-exit after the tenth time point t10c.

The first pattern HS-zero may be a pattern for informing a waiting period after entering from the first mode mode1 to the second mode mode2. The second pattern HS-sync may be a pattern informing a transmission start of the first encoded data eData1.

The third pattern HS-trail may be a pattern informing a transmission end of the first encoded data eData1. The third pattern HS-trail may be a pattern in which a value opposite to last data of the first encoded data eData1 is repeated.

The fourth pattern HS-exit may be a pattern informing that the second mode mode2 is ended and the first mode mode1 is started. The fourth pattern HS-exit may not be configured of a specific bit, but may be a transitional pattern in which a voltage is increased to exceed the second voltage range vr2.

The transmitter TXD may change the signals applied to the first line dp1 and the second line dn1 to the logic high level after the tenth time point t10c. For example, an output of the pattern LP-11 may proceed from an eleventh time point t11c. Accordingly, the transmitter TXD may inform that the second mode mode2 is ended and the first mode mode1 is started.

The receiver RXD may generate a clock signal (for example, a high-speed transmission word clock signal (or an RX clock signal (RXWORDCLK of FIG. 9)) using the clock training pattern CLK-T and the first payload ePayload. The first data receiver RX1 may include a clock data restoration circuit and may generate a clock signal having specific frequency and phase using the clock training pattern CLK-T.

In addition, the first data receiver RX1 may continuously correct the phase of the clock signal to prevent skew of the clock signal using the first payload ePayload. The first data receiver RX1 may sample the received data using the generated clock signal.

Therefore, according to an embodiment, the transceiver device TSCV capable of communicating using the MIPI protocol without a clock line may be provided.

Figure 5:
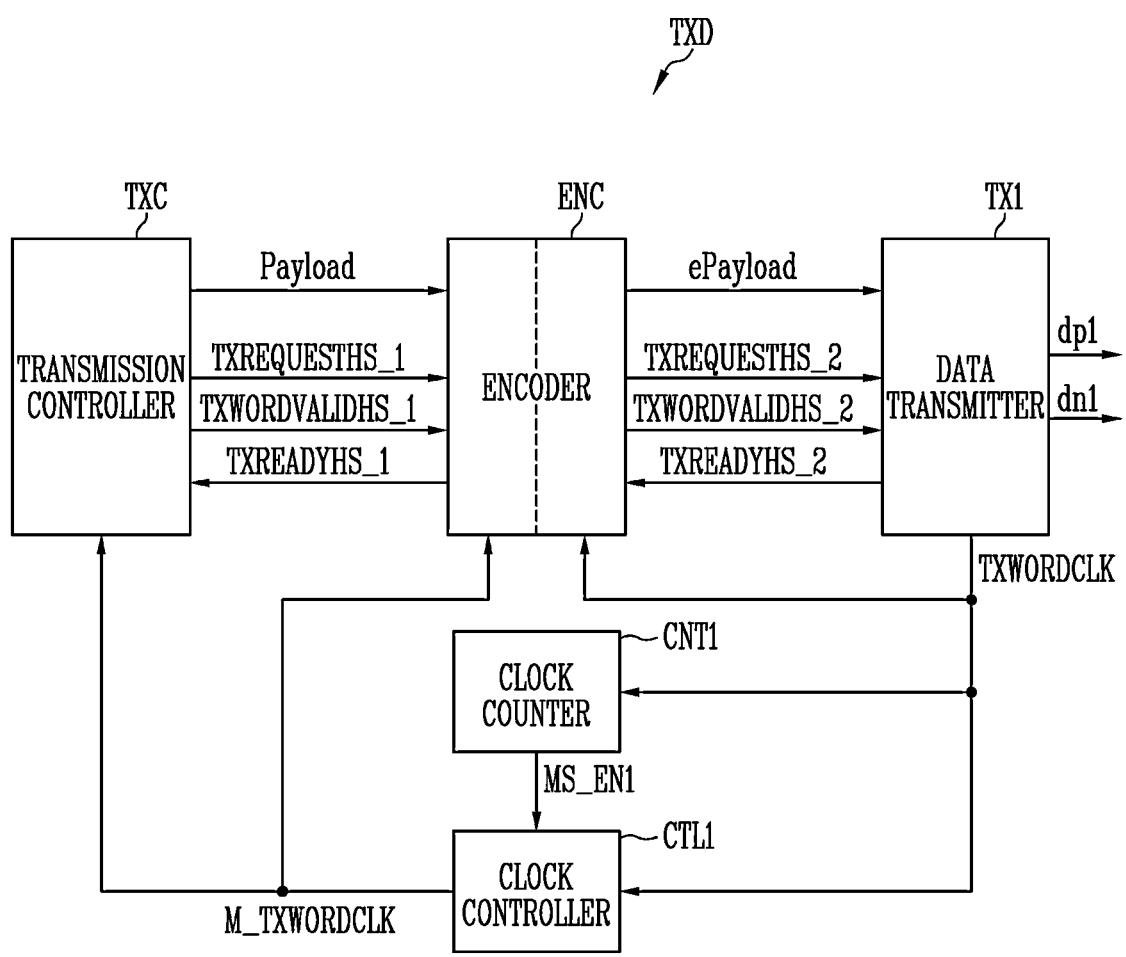
FIG. 5 is a block diagram illustrating an embodiment of a transmitter included in the transceiver device of FIGS. 1 and 2.

FIG. 5 is a block diagram illustrating an embodiment of the transmitter included in the transceiver device of FIGS. 1 and 2.

Referring to FIGS. 1, 2, 3, 4, and 5, an embodiment of the transmitter TXD may include the transmission controller TXC, the first data transmitter TX1 (hereinafter referred to as a data transmitter), the encoder ENC, a clock counter CNT1, and a clock controller CTL1.

The transmission controller TXC may transmit the first data Data1 including the original payload to the encoder ENC based on a modified TX clock signal M_TXWORDCLK.

In an embodiment, the transmission controller TXC may provide a first transmission request signal TXREQUESTHS_1 and a first indication signal TXWORDVALIDHS_1 to the encoder ENC.

The first transmission request signal TXREQUESTHS_1 may mean a signal indicating a high-speed transmission request. When the first transmission request signal TXREQUESTHS_1 is activated, data for switching from the first mode mode1 to the second mode mode2 may be output, and valid data including the original payload Payload may be provided from the transmission controller TXC to the encoder ENC.

The first indication signal TXWORDVALIDHS_1 may be a signal defined by the MIPI protocol, and may indicate that data to be transmitted to the encoder ENC is valid data.

In an embodiment, the transmission controller TXC may transmit first transmission data (for example, data including the original payload Payload) to the encoder ENC based on a modified clock signal M_TXWORDCLK which is a signal on which masking processing on a TX clock signal TXWORDCLK is performed. In an embodiment, for example, the transmission controller TXC may transmit the original payload Payload to the encoder ENC in synchronization with a gate-on level of the modified TX clock signal M_TXWORDCLK.

The encoder ENC may transmit second transmission data (for example, data including the first payload ePayload) to the data transmitter TX1. In an embodiment, for example, the encoder ENC may receive the original payload Payload based on the modified TX clock signal M_TXWORDCLK, and output the first payload ePayload based on the TX clock signal TXWORDCLK.

In an embodiment, the encoder ENC may encode at least a portion of the original payload Payload. In an embodiment, for example, the encoder ENC may encode the original payload Payload into the first payload ePayload.

The encoder ENC may perform data encoding according to a predetermined protocol. In an embodiment, the encoder ENC may perform data encoding so that data toggling occurs at least once per N bits of the original payload Payload, where N is an integer greater than 2. In an embodiment, for example, data may be toggled at least once per 6 bits by encoding of the encoder ENC.

In an embodiment, as shown in FIG. 3, the encoder ENC may generate the first encoded data eData1 by adding data before and after the first payload ePayload.

In an embodiment, the encoder ENC may generate the clock training pattern CLK-T in response to the first transmission request signal TXREQUESTHS_1, and transmit clock training pattern CLK-T to the data transmitter TX1.

In an embodiment, for example, the first encoded data eData1 may sequentially include the clock training pattern CLK-T, the start pattern STP, the first payload ePayload, and the end pattern EDP.

In an embodiment, the encoder ENC may provide a first transmission preparation signal TXREADYHS_1 to the transmission controller TXC. The first transmission preparation signal TXREADYHS_1 may indicate high-speed transmission preparation. When the first transmission preparation signal TXREADYHS_1 is activated, the original payload Payload may be transmitted to the encoder ENC. In an embodiment, for example, the original payload Payload may be serially transmitted to the encoder ENC.

In an embodiment, the encoder ENC may provide a second transmission request signal TXREQUESTHS_2 and a second indication signal TXWORDVALIDHS_2 to the data transmitter TX1.

The second transmission request signal TXREQUESTHS_2 may mean a high-speed transmission request. In an embodiment, the encoder ENC may activate the second transmission request signal TXREQUESTHS_2 in response to the first transmission request signal TXREQUESTHS_1. When the second transmission request signal TXREQUESTHS_2 is activated, the encoder ENC may transmit the clock training pattern CLK-T to the data transmitter TX1.

The second indication signal TXWORDVALIDHS_2 may be a signal defined by the MIPI protocol, and may indicate that data to be transmitted to the data transmitter TX1 is valid data.

In an embodiment, the encoder ENC may transmit the first payload ePayload to the data transmitter TX1 in synchronization with a gate-on level of the TX clock signal TXWORDCLK provided from the data transmitter TX1.

The data transmitter TX1 may generate the TX clock signal TXWORDCLK, and transmit the clock training pattern CLK-T and the first payload ePayload to the first line dp1 and the second line dn1. The TX clock signal TXWORDCLK may be provided to the encoder ENC, the clock counter CNT1, and the clock controller CTL1. In such an embodiment, the TX clock signal TXWORDCLK may be used to output the first payload ePayload in the encoder ENC.

The data transmitter TX1 may transmit data for switching from the first mode mode1 to the second mode mode2 to the receiver RXD in response to the second transmission request signal TXREQUESTHS_2.

The data transmitter TX1 may provide a second transmission preparation signal TXREADYHS_2 to the encoder ENC. The second transmission preparation signal TXREADYHS_2 may indicate high-speed transmission preparation. When the second transmission preparation signal TXREADYHS_2 is activated, the clock training pattern CLK-T provided to the data transmitter TX1 may be transmitted to the receiver RXD.

Thereafter, the data transmitter TX1 may transmit the first payload ePayload provided from the encoder ENC to the receiver RXD.

In an embodiment, the transmitter TXD may include the clock counter CNT1 and the clock controller CTL1 for preset masking of the TX clock signal TXWORDCLK.

The clock counter CNT1 may count the TX clock signal TXWORDCLK and generate a TX clock control signal MS_EN1 in response to a preset count value. In an embodiment, for example, the clock counter CNT1 may count a repetition of a period of the TX clock signal TXWORDCLK or a repetition of the gate-on level. The clock counter CNT1 may be implemented as a clock counting circuit of various known hardware configurations and/or software configurations.

In an embodiment, for example, when the count value of the clock counter CNT1 reaches a preset target value, the TX clock control signal MS_EN1 of a gate-on level (or an active level) may be output, and the count value of the clock counter CNT1 may be reset. Alternatively, the clock counter CNT1 may output the TX clock control signal MS_EN1 of the gate-on level (or the active level) whenever a multiple of the target value is counted.

The clock controller CTL1 may mask a portion of the TX clock signal TXWORDCLK based on the TX clock control signal MS_EN1. In an embodiment, for example, based on the TX clock control signal MS_EN1, the TX clock signal TXWORDCLK may be output at a gate-off level during a preset masking period (for example, a transmission masking period). In an embodiment, for example, the masking period may be one period or a half period of the TX clock signal TXWORDCLK. However, this is only an embodiment, and a length of the masking period is not limited thereto.

In an embodiment, the clock controller CTL1 may include a logic circuit such as an AND gate for masking one clock period of the TX clock signal TXWORDCLK by using the TX clock control signal MS_EN1 and the TX clock signal TXWORDCLK as an input.

The modified TX clock signal M_TXWORDCLK obtained by masking the TX clock signal TXWORDCLK may be provided to the transmission controller TXC. The transmission controller TXC may transmit the original payload Payload to the encoder ENC in synchronization with a gate-on level of the modified TX clock signal M_TXWORDCLK.

In an embodiment, the modified TX clock signal M_TXWORDCLK may be provided to an input terminal of the encoder ENC. In such an embodiment, the TX clock signal M_TXWORDCLK modified in the encoder ENC may be used for an input of the original payload Payload. The encoder ENC may receive the original payload Payload in synchronization with the gate-on level of the modified TX clock signal M_TXWORDCLK.

Therefore, the input of the original payload Payload from the transmission controller TXC to the encoder ENC may be held (maintained, or stopped) during the masking period. That is, since the modified TX clock signal M_TXWORDCLK has a gate-off level during the masking period, the input of the original payload Payload to the encoder ENC may be held (or stopped).

The transceiver device TSCV according to embodiments of the disclosure may include the encoder ENC in the transmitter TXD to remove a clock line between the transmitter TXD and the receiver RXD. Therefore, the first encoded data eData1 may include the clock information (for example, the clock training pattern CLK-T) to be restored in the receiver RXD.

In an embodiment, the first payload ePayload further includes additional data having information of the encoding key for the data encoding on the original payload Payload before encoding. Therefore, a data amount of output data (for example, the first payload ePayload) from the encoder ENC is may be greater than input data (for example, the original payload Payload) to the encoder ENC, which may act as data overhead.

In an embodiment, for example, an encoding key of 6 bits may be added per 186 bits of the original payload Payload, and the first payload ePayload of 192 bits may be output in response to the original payload Payload of 186 bits. In this case, the data overhead may be about 3.2% (that is, 192/186*100≈103.2). For integrity of data transmission and reception in the transceiver device TSCV, a processing time used for the data input to the encoder ENC and a processing time used for the data output from the encoder ENC may be desired to be the same as each other. In such an embodiment, an input frequency and an output frequency of each input/output data of the encoder ENC are desired to be identically maintained.

When a time corresponding to about 3.2% is added to an input processing time of data, of which data overhead is about 3.2%, input/output processing times (input/output frequencies) for the same original data may be substantially identical or similar to each other. In a case where a memory or the like for data input timing control is used to allow input/output processing times to be substantially identical or similar to each other, a manufacturing cost and complexity of the transmitter TXD are increased.

In embodiments of the disclosure, by masking 1 clock period per 32 clock periods of the TX clock signal TXWORDCLK, a time corresponding to 3.2% of the data input processing time (for example, a holding time for matching of the data input/output processing times) may be added. In such embodiments, the original payload Payload corresponding to 31 clock periods of the TX clock signal TXWORDCLK (that is, 31 toggling of the TX clock signal TXWORDCLK) may be transmitted to the encoder ENC during a time corresponding to 32 clock periods of the TX clock signal TXWORDCLK (that is, 32 toggling of the TX clock signal TXWORDCLK). (32/31*100≈103.2) At the same time, the first payload ePayload may be transmitted from the encoder ENC to the data transmitter TX1 in synchronization with the 32 clock periods of the TX clock signal TXWORDCLK.

Therefore, a time spent for a process of inputting data to the encoder ENC and a time spent for a process of outputting input data may become similar, and integrity of data transmission and reception may be maintained.

However, this is only an embodiment, and the masking period and the period of the TX clock signal TXWORDCLK are not limited thereto. In an alternative embodiment, for example, the masking period and the masking period may be adjusted according to a data overhead ratio of the encoded data.

Figure 6:
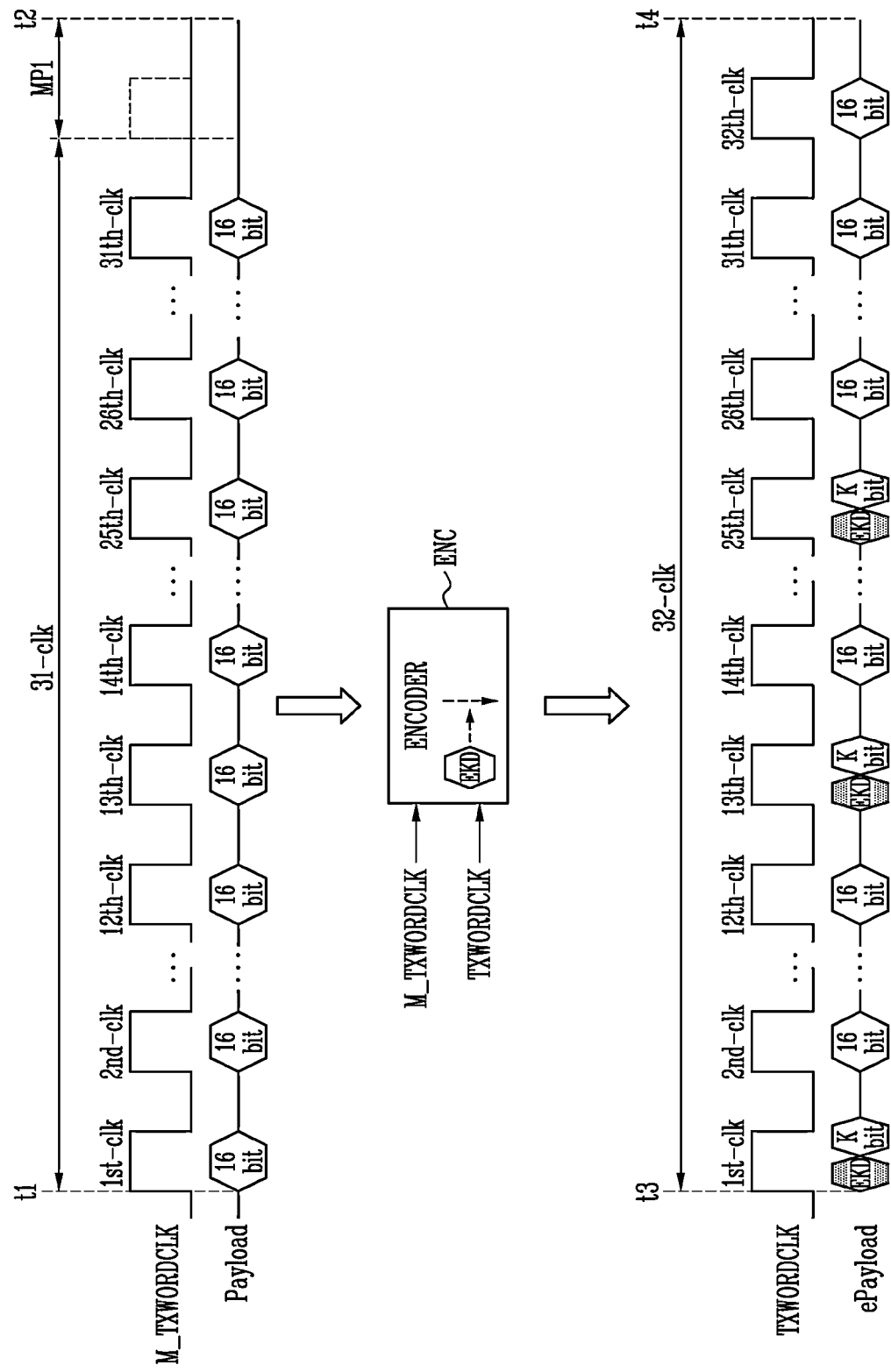
FIG. 6 is a diagram illustrating an embodiment of an operation of the transmitter of FIG. 5.

FIG. 6 is a diagram illustrating an embodiment of the operation of the transmitter of FIG. 5.

Referring to FIGS. 5 and 6, the original payload Payload may be input to the encoder ENC from the first time point t1 based on the modified TX clock signal M_TXWORD-CLK, and the first payload ePayload may be output from the encoder ENC from the third time point t3 based on the TX clock signal TXWORDCLK. In an embodiment, for example, the TX clock signal TXWORDCLK and the modified TX clock signal M_TXWORDCLK may be provided to the encoder ENC.

In an embodiment, the third time point t3 may be a time point after the first time point t1. In addition, the third time point t3 may precede or follow the second time point t2.

A time duration from the first time point t1 to the second time point t2 may be substantially the same as a time duration from the third time point t3 to the fourth time point t4.

In an embodiment, data of 16 bits (for example, the first payload ePayload) may be transmitted in response to each active level of the clock period of the TX clock signal TXWORDCLK. In such an embodiment, data of 16 bits (for example, the original payload Payload) may be transmitted in response to each active level of the clock period of the modified TX clock signal M_TXWORDCLK. However, this is only an embodiment, and a size of data transmitted per clock period of the TX clock signal TXWORDCLK is not limited thereto. In an embodiment, for example, data of 32 bits may be transmitted per clock period of the TX clock signal TXWORDCLK according to the frequency of the TX clock signal TXWORDCLK.

In an embodiment, as described above, the original payload Payload including predetermined valid data may be serially transmitted during 31 clock periods 31-clk among 32 clock periods of the modified TX clock signal M_TX-WORDCLK, and in a transmission masking period MP1, which is a thirty-second clock period of the clock signal, a data value of the original payload Payload transmitted immediately before may be held (or maintained) by the gate-off level of the modified TX clock signal M_TX-WORDCLK. Here, the gate-off level may be understood as a logic low level. However, this is only an embodiment, and the gate-on level may be set to a logic low level and the gate-off level may be set to a logic high level.

Therefore, the original payload Payload of a total of 496 bits may be supplied to the encoder ENC during the period from the first time point t1 to the second time point t2 including the transmission masking period MP1 (for example, 16*31=496).

Additional data corresponding to an encoding key EKD may be inserted by data encoding of the encoder ENC. In an embodiment, the first payload ePayload may include data of the original payload Payload into which the encoding key EKD is inserted. In an embodiment, for example, the encoding key EKD of 6 bits may be inserted per valid data of 186 bits. The encoding key EKD may be inserted and transmitted prior to the valid data. Thereafter, the receiver RXD may decode the valid data following the encoding key EKD based on the encoding key EKD. In addition, the receiver RXD may remove the encoding key EKD or replace (or substitute) the encoding key EKD with a predetermined dummy bit.

In an embodiment, for example, as shown in FIG. 6, in response to a first clock period 1st-clk, the encoding key EKD and valid data of a K bit (where K is a natural number) may be transmitted (or output) as the first payload ePayload. In such an embodiment, as shown in FIG. 6, the encoding key EKD may be 6 bits, and the valid data output in the first clock period 1st-clk may be 10 bits. Subsequently, valid data of a total of 186 bits may be serially transmitted (output) until a twelfth clock period 12th-clk.

Thereafter, the encoding key EKD of 6 bits and valid data of 10 bits may be output as the first payload ePayload in a thirteenth clock period 13th-clk. In addition, valid data of a total of 186 bits may be serially transmitted (output) until a twenty-fourth clock period.

Similarly, the encoding key EKD of 6 bits and valid data of 10 bits may be output as the first payload ePayload in a twenty-fifth clock period 25th-clk. Thereafter, valid data may be serially transmitted (outputted) until a thirty-second clock period.

That is, in the period from the third time point t3 to the fourth time point t4, data (for example, the first payload ePayload) obtained by encoding the valid data (for example, the original payload Payload) supplied to the encoder ENC from the first time point t1 to the second time point t2 may be transmitted to the first and second lines dp1 and dn1 through the data transmitter TX1.

However, this is only an embodiment, and a time point at which the encoding key EKD is transmitted and the clock period at which the encoding key EKD is transmitted in the period from the third time point t3 to the fourth time point t4 are not limited thereto. FIG. 6 is only an enlarged partial period of a data transmission process, and the encoding key EKD may also be transmitted in another clock period. In an embodiment, for example, the encoding key EKD may be inserted and transmitted every valid data of 186 bits regardless of the 32 clock period 32-clk. In addition, the encoding key EKD may be transmitted during or after transmission of the valid data in response to one clock period. In an embodiment, for example, the encoding key EKD of 6 bits may be transmitted after valid data of 10 bits is transmitted in response to one clock period.

According to an embodiment, valid data of last 2 bits input in a thirty-first clock period 31th-clk of the input of the encoder ENC may be output from the encoder ENC in a thirty-third clock period of an internal clock signal WCLK after the fourth time point t4.

In an embodiment, as described above, a length of a time (or a time duration) for the process of inputting data to the encoder ENC and a length of a time for the process of outputting the corresponding data may be substantially identical to or similar to each other, and an input frequency (for example, an input time) of valid data and an output frequency (for example, an output time) of the corresponding valid data in the encoder ENC may become substantially the same as (or be synchronized with) each other.

Figure 7:
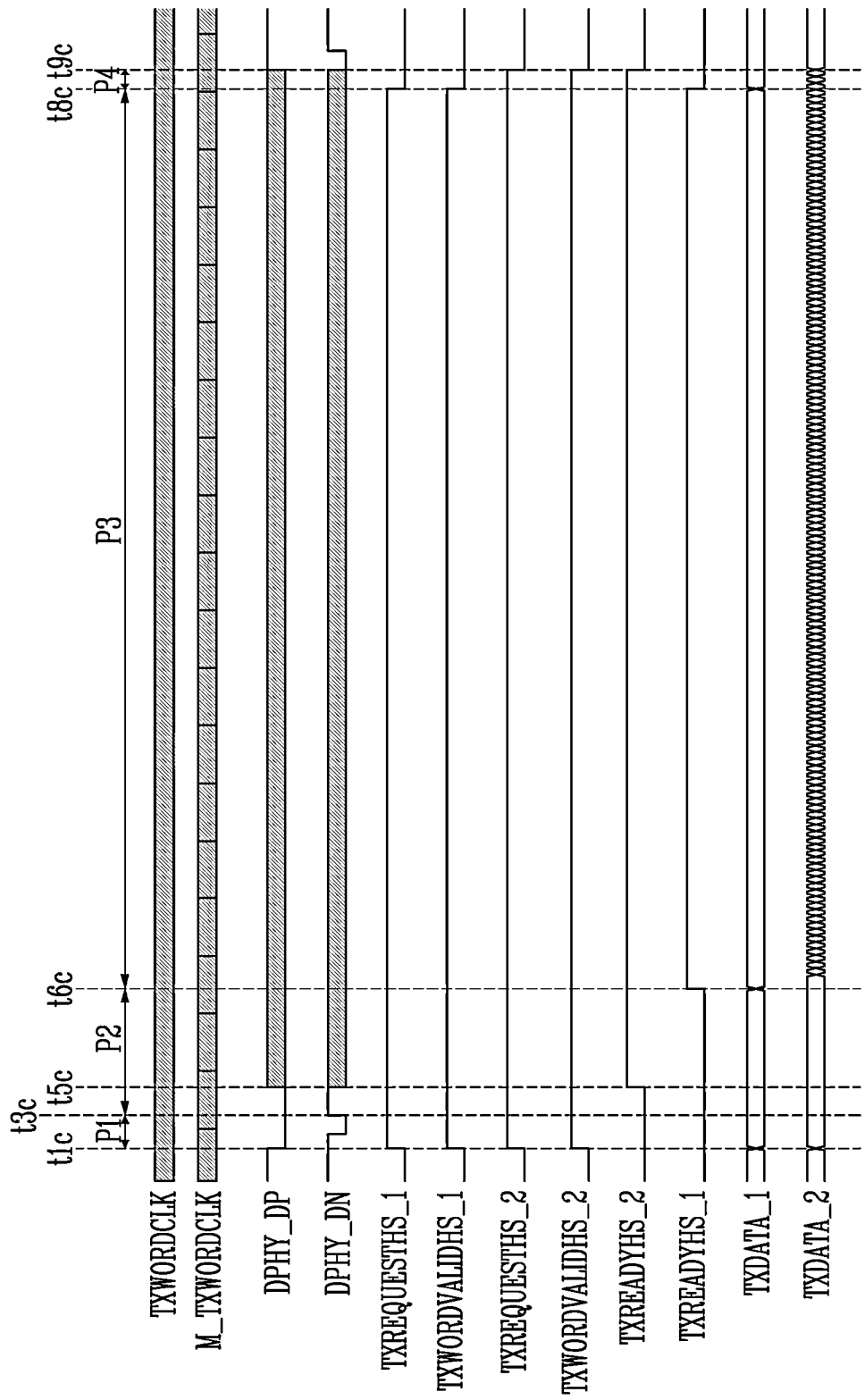
FIG. 7 is a timing diagram illustrating an embodiment of the operation of the transmitter of FIG. 5.

FIG. 7 is a timing diagram illustrating an embodiment of the operation of the transmitter of FIG. 5.

Referring to FIGS. 4, 5, and 7, the transmitter TXD may transmit data based on the MIPI protocol.

Hereinafter, operations of the transmitter during a period from the first time point t1c to the tenth time point t10c will be described in connection with the operation described with reference to FIG. 4.

Before the first time point t1c, a stop of the first mode mode1 may be instructed through an output of the pattern LP-11.

At the first time point t1c, the first transmission request signal TXREQUESTHS_1 and the second transmission request signal TXREQUESTHS_2 may be activated to a logic high level (or a gate-on level). When the first transmission request signal TXREQUESTHS_1 is activated, first transmission data TXDATA1 including the original payload Payload which is valid data may be transmitted from the transmission controller TXC to the encoder ENC. At this time, since a first transmission preparation signal TXREADYTH_1 is in an inactive state, an output of the encoder ENC is before an output of the first transmission data TXDATA1 (or data obtained by encoding the first transmission data TXDATA1).

When the second transmission request signal TXREQUESTHS_2 is activated, the encoder ENC may transmit second transmission data TXDATA2 including the clock training pattern CLK-T to the data transmitter TX1. At this time, since the second transmission preparation signal TXREADYHS_2 is in an inactive state, an output of the data transmitter TX1 is before a clock training start.

In an embodiment, a first indication signal TXWORDVALIDHS_1 may be output in synchronization with the first transmission request signal TXREQUESTHS_1, and a second indication signal TXWORDVALIDHS_2 may be output in synchronization with the second transmission request signal TXREQUESTHS_2.

A first period P1 between the first time point t1c and the third time point t3c may be a transition period from the first mode mode1 to the second mode mode2. A first output DPHY_DP may be an output to the first line dp1, and a second output DPHY_DN may be an output to the second line dp2. The first output DPHY_DP and the second output DPHY_DN in the first period P1 may be outputs in a transition period set by a communication protocol.

In addition, as described above, during the first period P1, the transmission controller TXC may transmit the valid data to the encoder ENC, and the encoder ENC may transmit the clock training pattern CLK-T to the data transmitter TX1.

At the third time point t3c, the second mode mode2 may be entered. Therefore, the first output DPHY_DP and the second output DPHY_DN may be output in a differential scheme.

In an embodiment, in a period from the third time point t3c to the fifth time point t5c, the first pattern HS-zero and the second pattern HS-sync may be first transmitted to the receiver RXD based on the MIPI protocol.

At the fifth time point t5c, the second transmission preparation signal TXREADYHS_2 may be activated. When the second transmission preparation signal TXREADYHS_2 is activated, the clock training pattern CLK-T may be output from the data transmitter TX1, and clock training may be started in the receiver RXD by the clock training pattern CLK-T. Accordingly, the clock training pattern CLK-T may be transmitted to the receiver RXD during the period from the fifth time point t5c to the sixth time point t6c.

As described above, a second period P2 between the third time point t3c and the sixth time point t6c may be a second mode start and a clock training period.

In an embodiment, since the first transmission preparation signal TXREADYHS_1 is in an inactive state in the second period P2, transmission of the first transmission data TXDATA_1 may be in a hold state, transmission of the second transmission data TXDATA_2, which is based on the first transmission data TXDATA_1, may also be in a hold state. That is, in the second period P2, the data transmitter TX1 may transmit the clock training pattern CLK-T to the receiver RXD.

At the sixth time point t6c, the first transmission preparation signal TXREADYHS_1 may be activated. When the first transmission preparation signal TXREADYHS_1 is activated, the first transmission data TXDATA_1 including the original payload Payload may be transmitted from the transmission controller TXC to the encoder ENC again.

The encoder ENC may encode the first transmission data TXDATA_1 and transmit the encoded first transmission data TXDATA_1 to the first data transmitter TX1 as the second transmission data TXDATA_2. A time delay may occur between the activation of the first transmission preparation signal TXREADYHS_1 and an output start of the second transmission data TXDATA_2 by a time spent for data encoding.

According to an embodiment, the second transmission data TXDATA_2 output from the encoder ENC after the sixth time point t6c may correspond to data, which is encoded from the first transmission data TXDATA_1 provided from the transmission controller TXC, and sequentially output from the first time point t1c. In an embodiment, for example, the second transmission data TXDATA_2 may include the first payload ePayload.

A third period P3 between the sixth time point t6c and the ninth time point t9c may be a period in which the start pattern STP, the first payload ePayload, and the end pattern EDP are sequentially transmitted to the receiver RXD.

At the eighth time point t8c, the first transmission request signal TXREQUESTHS_1 and the first transmission preparation signal TXREADY_1 may be deactivated. Therefore, transmission of the first transmission data TXDATA1 including the original payload may be ended.

In a fourth period P4 between the eighth time point t8c and the ninth time point t9c, the second transmission request signal TXREQUESTHS_2 and the second transmission preparation signal TXREADY_2 may maintain an activated state. In the corresponding period, the end pattern EDP may be output. In addition, during the fourth period P4, all remaining portions of the second transmission data TXDATA_2 delayed by the encoder ENC may be transmitted to the receiver RXD through the data transmitter TX1.

At the ninth time point t9c, the second transmission request signal TXREQUESTHS_2 and the second transmission preparation signal TXREADY_2 may be deactivated. Therefore, data transmission of the encoder ENC may be ended. Thereafter, the transceiver device TSCV including the data transmitter TX1 may be switched to the first mode mode1.

Figure 8:
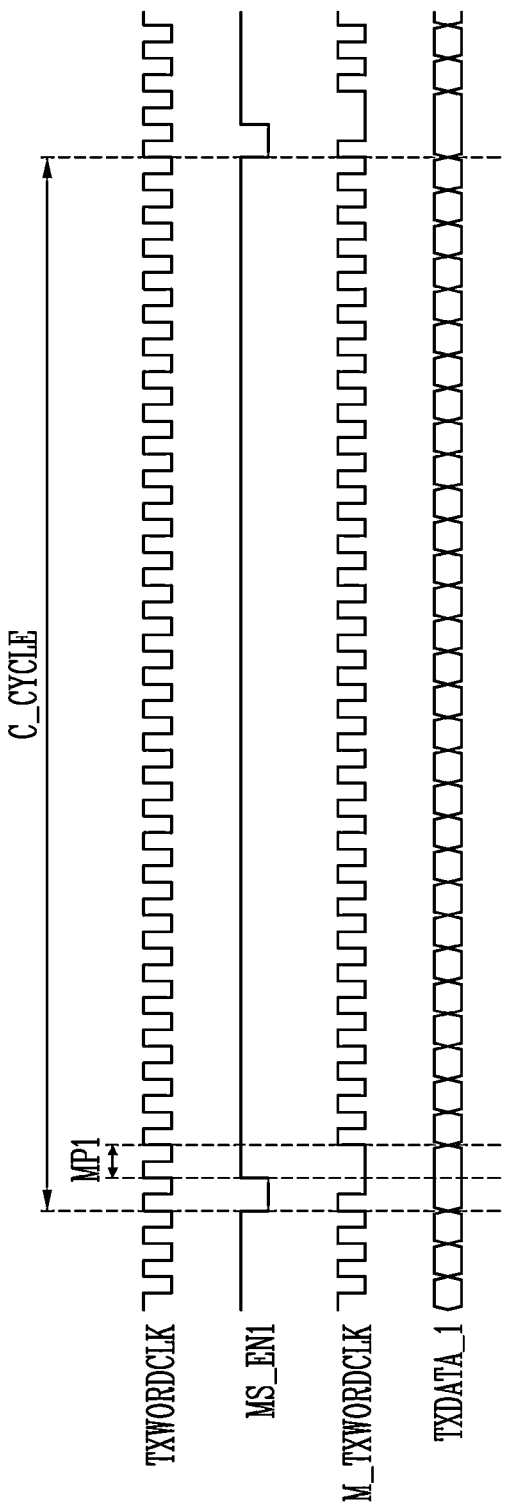
FIG. 8 is a timing diagram illustrating an embodiment of masking a TX clock signal of FIG. 7.

FIG. 8 is a timing diagram illustrating an embodiment of masking the TX clock signal of FIG. 7.

Referring to FIGS. 5, 6, 7, and 8, the clock counter CNT1 may periodically activate the TX clock control signal MS_EN1 by counting the TX clock signal TXWORDCLK.

In an embodiment, for example, the TX clock control signal MS_EN1 may be activated in every 32 clock periods of the TX clock signal TXWORDCLK. In FIG. 8, 32 clock periods of the TX clock signal TXWORDCLK are expressed as C_PERIOD.

The clock controller CTL1 may mask the TX clock signal TXWORDCLK of one clock period corresponding to the transmission masking period MP1 in response to the TX clock control signal MS_EN1. Therefore, the modified TX clock signal M_TXWORDCLK having a gate-off level (a deactivate level, or a logic low level) may be generated in the transmission masking period MP1.

The modified TX clock signal M_TXWORDCLK may be supplied to an input terminal of the encoder ENC and the transmission controller TXC. The transmission controller TXC may serially transmit the original payload Payload for each one clock period of the modified TX clock signal M_TXWORDCLK. The encoder ENC may also receive the original payload Payload for each one clock period of the modified TX clock signal M_TXWORDCLK. Therefore, an input of the original payload Payload to the encoder ENC may be held (or stopped) in the transmission masking period MP1.

In an embodiment, as described above, the transceiver device TSCV may perform data communication through data including the clock information using the MIPI protocol without a clock line. Therefore, since a line for clock is not used, a space and a cost for the line for clock may be reduced, and power consumption may also be reduced.

In an embodiment, the transmitter TXD may periodically mask the TX clock signal TXWORDCLK to prevent or minimize a data communication error due to a difference of data input/output processing time for the same valid data in the encoder ENC due to data overhead. Therefore, the data input processing frequency and the data output processing frequency of the encoder ENC may become substantially equal to (or be synchronized with) each other, and integrity of data transmission and reception may be maintained.

In such an embodiment, since the data input processing frequency and the data output processing frequency of the encoder ENC become substantially the same as each other only by masking the internal clock signal without additional generation of a clock signal or using a memory for integrity of data transmission and reception, an increase of circuit complexity may be minimized, and a cost may be reduced.

Figure 9:
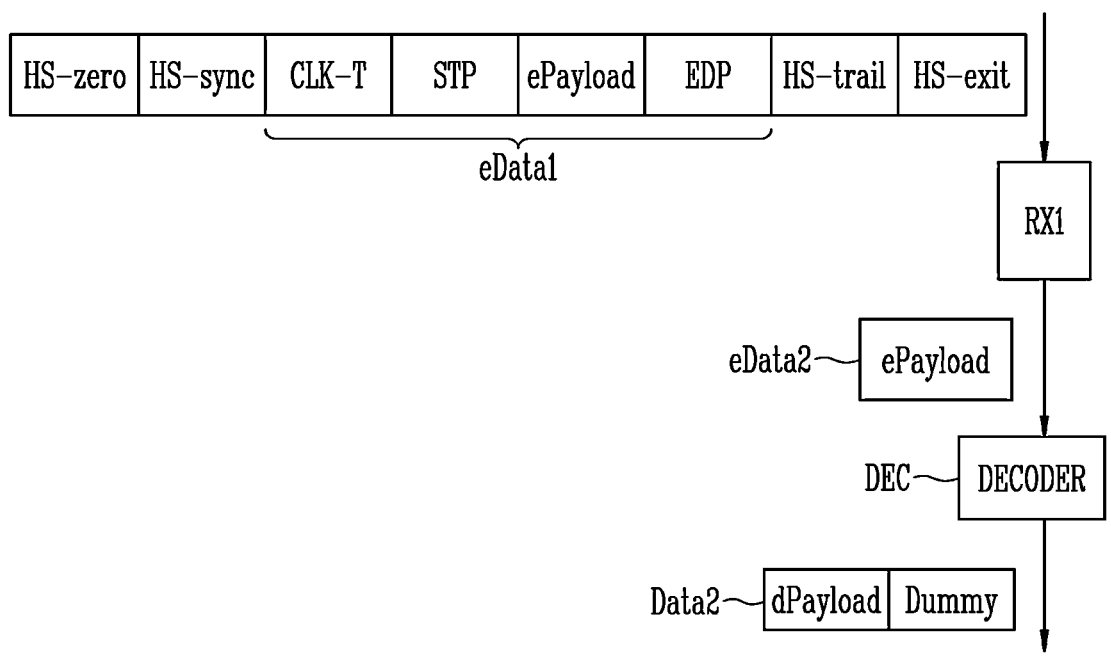
FIG. 9 is a diagram illustrating an embodiment of an operation of a receiver included in the transceiver device of FIGS. 1 and 2.

FIG. 9 is a diagram illustrating an embodiment of the operation of the receiver included in the transceiver device of FIGS. 1 and 2.

Referring to FIGS. 1, 2, and 9, the first data receiver RX1 (hereinafter referred to as a data receiver) may provide the second encoded data eData2 including the first payload ePayload to the decoder DEC.

The decoder DEC may decode the second encoded data eData2 (for example, the first payload ePayload) to generate the second data Data2 (or reception data), and provide the generated second data Data2 to the reception controller RXC.

The second data Data2 may include a second payload dPayload and a dummy pattern Dummy. Since the second payload dPayload is substantially the same as the original payload Payload of the first data Data1 provided by the transmission controller TXC, separate phase information is not included.

The dummy pattern Dummy may be pre-encoded to be embedded in the first payload ePayload by the encoder ENC, or may be added by the decoder DEC. The dummy pattern Dummy may be data in which the same value is repeated.

In an embodiment, for example, when a last value of the second payload dPayload is 0, the dummy pattern Dummy may be data in which 1 is repeated, and when the last value of the second payload dPayload is 1, the dummy pattern Dummy may be data in which 0 is repeated. Therefore, since a format (the payload and the dummy pattern Dummy) of the second data Data2 received by the reception controller RXC of FIG. 1 may be substantially the same as a format of data provided to the existing reception controller, even though a clock line is not included in the transceiver device TSCV, an MIPI protocol interface may be used without any modification thereto.

Formats of the signals RxActiveHS, RxValidHS, and RxSyncHS generated by the receiver RXD (for example, the data receiver RX1) may be substantially the same as formats generated by a general MIPI. Therefore, according to an embodiment, the MIPI protocol interface may be used without any modification thereto even though the clock line is removed from the transceiver device TSCV.

In an embodiment, for example, the data receiver RX1 may parallelize the first payload ePayload included in the first encoded data eDATA1 through a deserializer (for example, parallelize to 8 lines), and transmit the parallelized second encoded data eData2 or first payload ePayload to the decoder DEC. As described above, the first payload ePayload may include data in which the original payload Payload is encoded and the encoding key EKD of FIG. 6.

The decoder DEC may generate the second data Data2 (for example, reception data) by decoding the second encoded data eData2. The decoder DEC may provide the second data Data2 to the reception controller RXC. The second data Data2 may include the second payload dPayload configured in a byte unit (for example, 2 byte unit) and additional information. Here, the additional information may be information corresponding to the dummy pattern Dummy rather than the third pattern HS-trail. In an embodiment, for example, the additional information may be 8-bit information in which 0 is repeated or 1 is repeated.

In an embodiment, the data decoded by the decoder DEC may not include the encoding key EKD, and data corresponding to the encoding key EKD may be reduced.

In an alternative embodiment, the decoder DEC may replace (substitute) the encoding key EKD with a predetermined dummy bit. In such an embodiment where the encoding key EKD is substituted with a dummy bit, the dummy bit may be output as the dummy pattern Dummy described with reference to FIG. 9.

Figure 10:
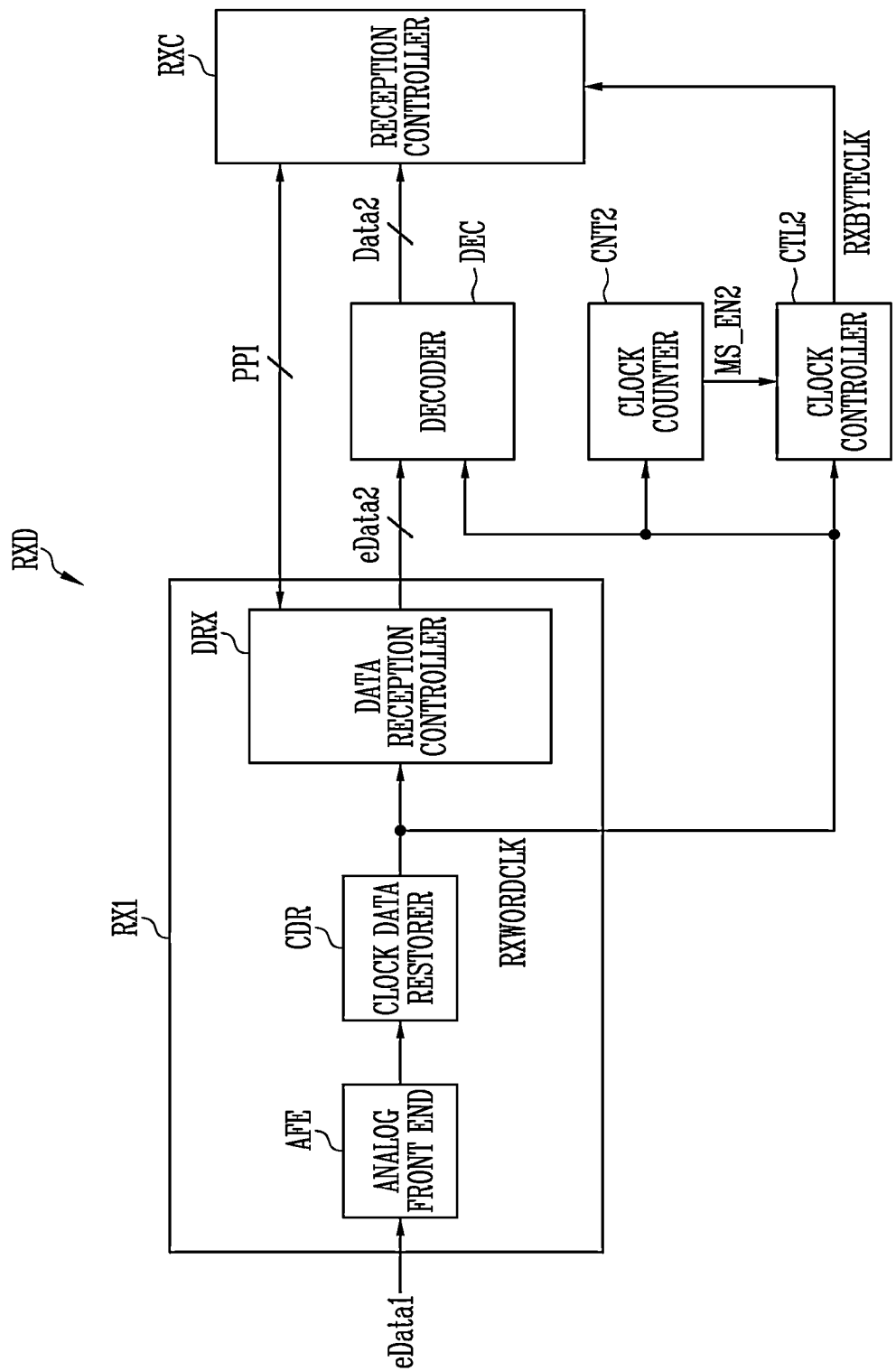
FIG. 10 is a block diagram illustrating an embodiment of the receiver included in the transceiver device of FIGS. 1 and 2.

FIG. 10 is a block diagram illustrating an embodiment of the receiver included in the transceiver device of FIGS. 1 and 2.

Referring to FIGS. 1, 2, 9, and 10, an embodiment of the receiver RXD may include the data receiver RX1, the reception controller RXC, the decoder DEC, a clock counter CNT2, and a clock controller CTL2.

The data receiver RX1 may receive the first encoded data eDATA1 from the first line dp1 and the second line dn1, and generate an RX clock signal RXWORDCLK and the second encoded data eData2 based on the first encoded data eDATA1.

In an embodiment, the data receiver RX1 may include an analog front end AFE, a clock data restorer CDR, and a data reception controller DRX. The analog front end AFE and the clock data restorer CDR may be included in a PHY ANALOG block, and the data reception controller DRX may be included in a PHY LOGIC block.

The analog front end AFE may amplify the first encoded data eData1 in a specific frequency band or filter noise (for example, high frequency noise) of the first encoded data eData1. The analog front end AFE may compensate for signal distortion generated in a process of transmitting the first encoded data eData1 at a high speed through the first line dp1 and the second line dn1.

The clock data restorer CDR may generate the clock signal corresponding to the received clock training pattern CLK-T. The clock data restorer CDR may generate the frequency information and the phase information of the clock training pattern CLK-T.

In an embodiment, for example, the clock data restorer CDR may include a loop circuit for restoring (or generating) a clock signal having specific frequency and phase (for example, the same frequency and phase as the data clock training pattern CLK-T) by tracking the first encoded data eDATA1. A bandwidth of the clock data restorer CDR may determine a range in which a frequency of the clock signal may be varied.

In an embodiment, the clock data restorer CDR may generate (restore) the RX clock signal RXWORDCLK from the first encoded data eData1. In an embodiment, for example, the clock data restorer CDR may generate a restoration clock signal corresponding to the clock training pattern CLK-T, and generate the RX clock signal RXWORDCLK used for driving the receiver RXD based on the restoration clock signal. In an embodiment, for example, the RX clock signal RXWORDCLK of a desired frequency may be generated by multiplying, dividing, mixing, or the like a frequency of the restoration clock signal.

In an embodiment, for example, the frequency of the RX clock signal RXWORDCLK may be determined so that data of 32 bits (for example, 1 word) is transmitted per clock period of the RX clock signal RXWORDCLK. However, this is an embodiment, and the frequency of the RX clock signal RXWORDCLK is not limited thereto.

The RX clock signal RXWORDCLK may be provided to the data reception controller DRX, the decoder DEC, the clock counter CNT2, and the clock controller CTL2.

The data reception controller DRX may be a PHY LOGIC capable of communicating with the reception controller RXC. The data reception controller DRX may communicate with the reception controller RXC by transmitting and receiving various data and control signals based on a PHY protocol interface (PPD).

In an embodiment, the data reception controller DRX may include a deserializer. The data reception controller DRX may output the second encoded data eDATA2 by parallelizing the first payload ePayload of the first encoded data eDATA1 through the deserializer. The second encoded data eDATA2 corresponding to the first payload ePayload may be transmitted to the decoder DEC. The second encoded data eDATA2 may include the encoding key EKD described with reference to FIG. 6.

The decoder DEC may receive the second encoded data eDATA2 from the data receiver RX1 in synchronization with a gate-on level of the RX clock signal RXWORDCLK. In an embodiment, for example, the second encoded data eDATA2 may be provided to the decoder DEC for each clock period of the RX clock signal RXWORDCLK.

The decoder DEC may decode the second encoded data eDATA2 corresponding to the first payload ePayload as reception data Data2. The reception data Data2 may include data of the original payload Payload from which the encoding key EKD is removed. Therefore, a data bit difference between the second encoded data eDATA2 that is an input of the decoder DEC and the reception data Data2 that is an output of the decoder DEC may occur. In a case, for example, an output of 186 bits from which the encoding key EKD of 6 bits removed may be generated per 192 bits of input data, and the number of data bits (amount of data) of the output compared to the input is insufficient. Therefore, in this case, input/output mismatch of the decoder DEC may occur.

In an embodiment, as described above, for the integrity of the data transmission and reception, the processing time spent for data input to the decoder DEC and the processing time spent for data output from the decoder DEC are desired to be the same as each other. In such an embodiment, the input frequency and the output frequency of each input/output data of the decoder DEC are desired to be maintained to be the same as each other.

In an embodiment, the RX byte clock signal RXBYTECLK involved in the output of the decoder DEC may be output in a form in which a portion thereof is masked to prevent such mismatch of the input/output of the decoder DEC and a difference of the input/output frequency of the decoder.

The RX byte clock signal RXBYTECLK may be a clock signal for informing a data transmission unit of a byte unit. In an embodiment, for example, the RX byte clock signal RXBYTECLK may indicate that 4 bytes (=1 word=32 bits) of the second data Data2 are transmitted per one period of the RX byte clock signal RXBYTECLK. In addition, the RX byte clock signal RXBYTECLK may be a clock signal used for data processing in the reception controller RXC. In an embodiment, for example, the RX byte clock signal RXBYTECLK may be a clock signal for the output of the decoder DEC and subsequent data processing.

The clock counter CNT2 may count the RX clock signal RXWORDCLK and generate the RX clock control signal MS_EN2 in response to a preset count value. In an embodiment, for example, the clock counter CNT2 may count the repetition of the period of the RX clock signal RXWORDCLK or the repetition of the gate-on level. The clock counter CNT2 may be implemented as a clock counting circuit of various known hardware configurations and/or software configurations.

In an embodiment, for example, when the count value of the clock counter CNT2 reaches a preset target value, the RX clock control signal MS_EN2 of the gate-on level (or the active level) may be output, and the count value of the clock counter CNT2 may be reset. Alternatively, the clock counter CNT2 may output the RX clock control signal MS_EN2 of the gate-on level (or the active level) whenever a multiple of the target value is counted.

The clock controller CTL2 may mask a portion of the RX clock signal RXWORDCLK based on the RX clock control signal MS_EN2. For example, based on the RX clock control signal MS_EN2, the RX clock signal RXWORDCLK may be output at a gate-off level during a preset masking period (for example, a reception masking period). In an embodiment, for example, the reception masking period may be one period or a half period of the RX clock signal RXWORDCLK. However, this is only an embodiment, and the length of the masking period is not limited thereto.

In an embodiment, the clock controller CTL2 may include a logic circuit such as an AND gate for masking one clock period of the RX clock signal by using the RX clock control signal MS_EN2 and the RX clock signal RXWORDCLK as an input.

The RX byte clock signal RXBYTECLK obtained by masking the RX clock signal RXWORDCLK may be provided to the reception controller RXC. The reception data Data2 output from the decoder DEC may be transmitted to the reception controller RXC in synchronization with the gate-on level of the RX byte clock signal RXBYTECLK.

Therefore, transmission of the reception data Data2 from the decoder DEC to the reception controller RXC may be held during the reception masking period. That is, since the RX byte clock signal RXBYTECLK has a gate-off level during the reception masking period, an input of the reception data Data2 to the reception controller RXC may be held (or stopped). In such an embodiment, the reception controller RXC is substantially the same as that described above with reference to FIGS. 1 and 2, and the like, and any repetitive detailed description thereof is omitted.

Figure 11:
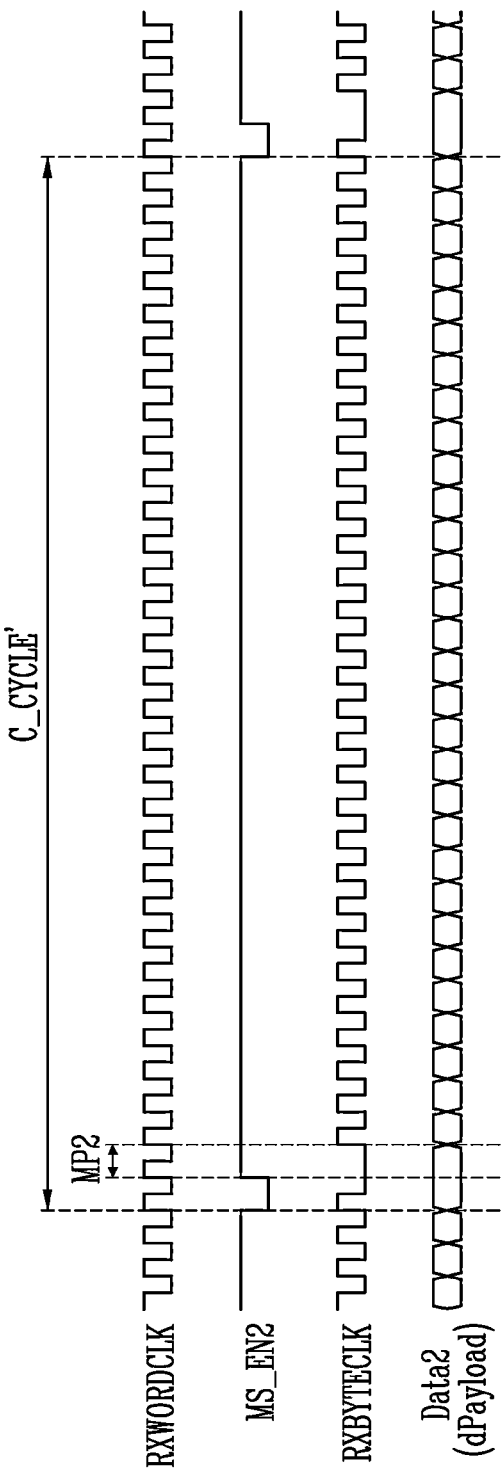
FIG. 11 is a diagram illustrating an embodiment of the operation of the receiver of FIG. 10.

FIG. 11 is a diagram illustrating an embodiment of an operation of the receiver of FIG. 10.

Referring to FIGS. 9, 10, and 11, in an embodiment, the clock counter CNT2 may periodically activate the RX clock control signal MS_EN2 by counting the RX clock signal RXWORDCLK.

In an embodiment, for example, the RX clock control signal MS_EN2 may be activated in 32 clock periods of the RX clock signal RXWORDCLK. In FIG. 11, 32 clock periods of the RX clock signal RXWORDCLK are expressed as C_PERIOD'.

In an embodiment, the second encoded data eData2 of 32 bits may be input to the decoder DEC per one period of the RX clock signal RXWORDCLK, and the reception data Data2 of 32 bits may be output from the decoder DEC per one period of the RX byte clock signal RXBYTECLK. However, this is only an embodiment, and a frequency of the RX clock signal RXWORDCLK and the like is not limited thereto. In an alternative embodiment, for example, the second encoded data eData2 of 16 bits may be input to the decoder DEC per one period of the RX clock signal RXWORDCLK according to a setting.

The clock controller CTL2 may mask the RX clock signal RXWORDCLK of one clock period corresponding to a reception masking period MP2 in response to the RX clock control signal MS_EN2. Therefore, the RX byte clock signal RXBYTECLK having a gate-off level (a deactivate level, or a logic low level) may be generated during the reception masking period MP2. In this case, data output from the decoder DEC may be maintained (or held) during the reception masking period MP2 by the RX byte clock signal RXBYTECLK supplied and overlapping the RX clock control signal MS_EN2.

In an embodiment, as shown in FIG. 11, the reception masking period MP2 masks only one clock period of the RX clock signal RXCORDLCK, but is not limited thereto, and the reception masking period MP2 may correspond to a plurality of successive clock periods of the RX clock signal RXCORDLCK. In an embodiment, for example, the reception masking period MP2 may overlap six clock periods of the RX clock signal RXCORDLCK.

In an embodiment, as described above, since the encoding key EKD of 6 bits is inserted for every valid data of valid 186 bits into the first encoded data eDATA1, valid data and invalid data have a ratio of 31:1. Accordingly, by masking 1 clock period per 32 clock periods of the RX clock signal RXWORDCLK (that is, generating the RX byte clock signal RXBYTECLK), a holding time for matching the data input/output processing times in the decoder DEC may be added. That is, the RX clock signal RXWORDCLK may be a masked RX byte clock signal RXBYTECLK to correspond to a data ratio of valid data and invalid data.

In such an embodiment, the second encoded data eData2 including the encoding key EKD may be supplied to the decoder DEC during a time corresponding to 32 clock periods of the RX clock signal RXWORDCLK (that is, 32 toggling of the RX clock signal RXWORDCLK).

In such an embodiment, the encoding key EKD may be removed during a time corresponding to 31 clock periods of the RX byte clock signal RXBYTECLK (that is, 31 toggling of the RX byte clock signal RXBYTECLK), and the decoded reception data Data2 may be output from the decoder DEC.

Therefore, a time spent for valid data input processing for the decoder DEC and a time spent for output processing of decoded valid data of a data amount corresponding thereto may become similar to each other, and the integrity of the data transmission and reception may be maintained.

In an embodiment, as described above, the transceiver device TSCV may perform data communication through data including the clock information using the MIPI protocol without a clock line. Therefore, since a line for clock is not included, a space and a cost for the line for clock may be reduced, and power consumption may also be reduced.

In an embodiment, the transmitter TXD may periodically mask the TX clock signal TXWORDCLK, and the receiver RXD may periodically mask the RX clock signal RXWORDCLK to prevent or minimize a data communication error due to a difference of a data input/output processing time for the same valid data in the encoder ENC and the decoder DEC due to data overhead. Therefore, the data input processing frequency and the data output processing frequency of the encoder ENC may become substantially equal to (or be synchronized with) each other, and the data input processing frequency and the data output processing frequency of the decoder DEC may become substantially equal to (or be synchronized with) each other. Accordingly, integrity of data transmission and reception may be maintained.

In such an embodiment, since the integrity of the data transmission and reception is improved only by masking the internal clock signal without additional generation of the clock signal or using a memory, an increase of circuit complexity may be minimized and a cost may be reduced.

Figure 12:
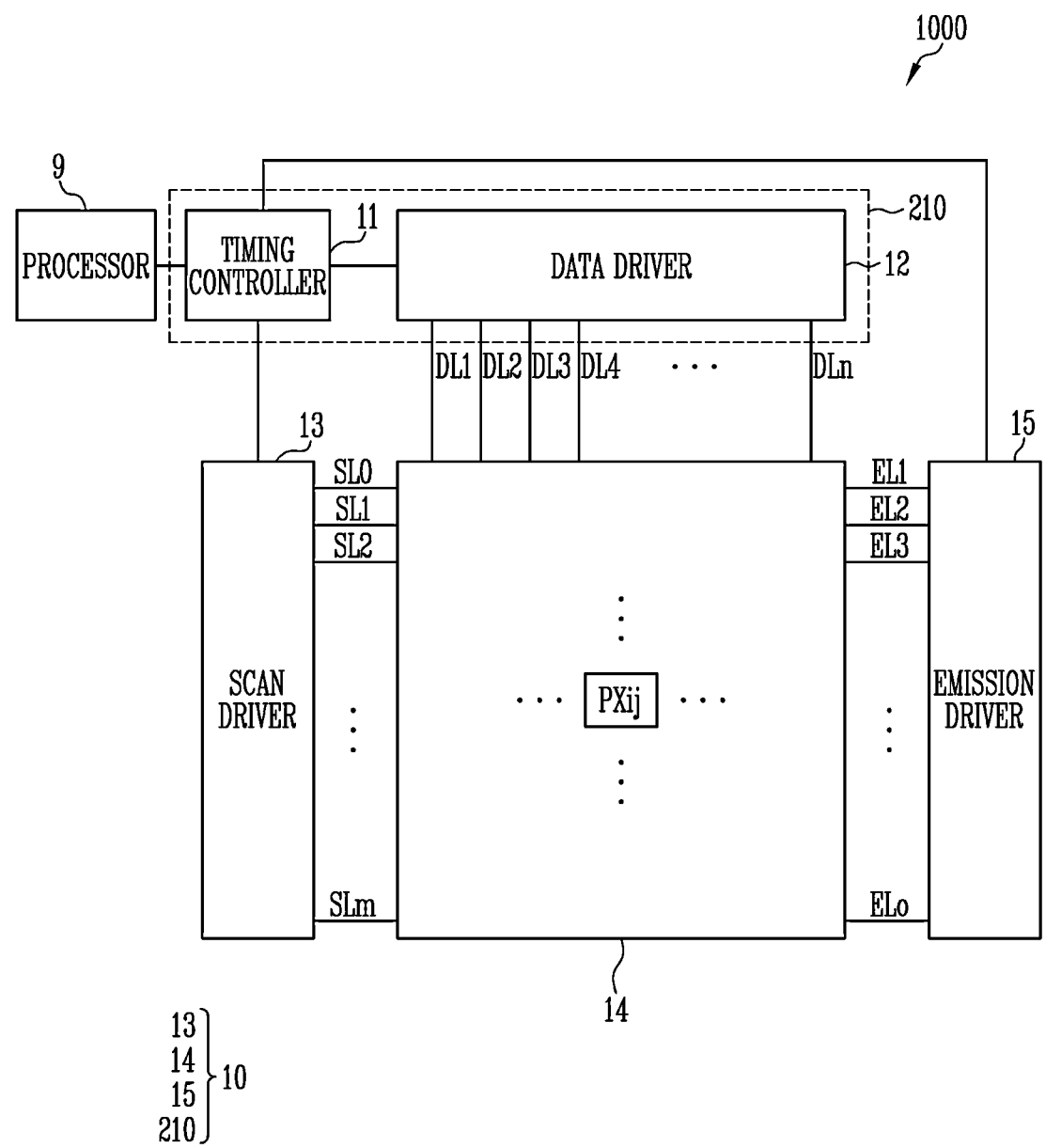
FIG. 12 is a block diagram illustrating a display system according to embodiments of the disclosure.

FIG. 12 is a block diagram illustrating a display system according to embodiments of the disclosure.

Referring to FIGS. 1, 2, and 12, an embodiment of the display system 1000 may include a display module 10 and a processor 9.

In an embodiment, the transceiver device (for example, TSCV of FIG. 1 or 2) may be in charge of communication and data transmission and reception between the display module 10 and the processor 9.

The display module 10 may include a timing controller 11, a data driver 12, a scan driver 13, a pixel unit 14, and an emission driver 15. However, whether each functional unit is integrated into one IC, integrated into a plurality of ICs, or mounted on a display substrate may be variously configured according to a specification of a display device. In an embodiment, the timing controller 11 and the data driver 12 may be integrated into one IC and may be configured as one display driver 210. In such an embodiment, the display driver 210 may be referred to as the above-described TED. According to a type, the display driver 210 may further include at least one selected from the scan driver 13 and the emission driver 15.

The processor 9 may correspond to at least one selected from a GPU, a CPU, an AP, and the like. In an embodiment, the processor 9 may output image data to be used in the display module 10.

The processor 9 may include the above-described transmitter TXD. In an embodiment, the timing controller 11, the data driver 12, or the display driver 210 may include the above-described receiver RXD (refer to FIG. 1).

The timing controller 11 may receive grayscales and timing signals for each display frame period from the processor 9. The timing signals may include a vertical synchronization signal, a horizontal synchronization signal, a data enable signal, and the like.

The timing controller 11 may provide rendered or non-rendered grayscales to the data driver 12. In addition, the timing controller 11 may provide a data driving control signal to the data driver 12.

The timing controller 11 may provide a scan driving control signal to the scan driver 13 and may provide an emission driving control signal to the emission driver 15.

The data driver 12 may generate data voltages (that is, data signals) to be provided to data lines DL1, DL2, DL3, DL4, . . . , and DLn (where n is an integer greater than 4) using the grayscales and the data driving control signal received from the timing controller 11.

The scan driver 13 may generate scan signals to be provided to scan lines SL0, SL1, SL2, . . . , and SLm (where m is an integer greater than 2) using the scan driving control signal (for example, a clock signal, a scan start signal, and the like) received from the timing controller 11. The scan driver 13 may sequentially supply scan signals having a turn-on level pulse to the scan lines SL0, SL1, SL2, . . . , and SLm.

The emission driver 15 may generate emission control signals to be provided to emission control lines EL1, EL2, EL3, . . . , and ELo (where o is an integer greater than 3) using the emission driving control signal (for example, a clock signal, an emission control start signal, and the like) received from the timing controller 11. The emission driver 15 may sequentially supply the emission control signals to the emission control lines EL1, EL2, EL3, . . . , and ELo.

The pixel unit 14 may include pixels PXij (where i is a positive integer less than or equal to m, and j is a positive integer less than or equal to n). Each of the pixels PXij may be connected to a corresponding data line, a corresponding scan line, and a corresponding emission control line. Each of the pixels PXij may emit light with a luminance corresponding to a data voltage applied thereto.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A transceiver device comprising:
a transmitter and a receiver connected to each other through a first line and a second line,
wherein the transmitter transmits signals having a first voltage range to the first line and the second line in a first mode, and transmits signals having a second voltage range less than the first voltage range to the first line and the second line in a second mode,
the transmitter encodes an original payload to generate a first payload in the second mode, and transmits a clock training pattern and the first payload through the first line and the second line in the second mode, and
the receiver decodes the first payload to output reception data corresponding to the original payload in the second mode,
the receiver generates an RX clock signal based on the clock training pattern and the first payload,
the first payload is input to the decoder in synchronization with each active level of a clock period of the RX clock signal, and
the reception data is output from the decoder in synchronization with each active level of a clock period of an RX byte clock signal, which is generated by masking a portion of the RX clock signal.

2. The transceiver device according to claim 1, wherein the first line and the second line are used in a single-ended scheme in the first mode, and
the first line and the second line are used in a differential scheme in the second mode.

3. The transceiver device according to claim 1, wherein the transmitter encodes the original payload into the first payload including an encoding key, and
the receiver provides the reception data through decoding by which the encoding key is removed from the first payload.

4. The transceiver device according claim 3, wherein the receiver masks the RX clock signal during a reception masking period.

5. The transceiver device according to claim 4, wherein the receiver comprises:
a data receiver which transmits the first payload from the first line and the second line based on the RX clock signal;
a decoder which decodes the first payload provided from the data receiver into the reception data;
a clock counter which counts the RX clock signal and generate an RX clock control signal in response to a preset count value;
a clock controller which masks a portion of the RX clock signal based on the RX clock control signal and outputs the RX byte clock signal, which is generated by masking the portion of the RX clock signal based on the RX clock control signal; and
a reception controller which receives the reception data from the decoder in synchronization with the RX byte clock signal.

6. The transceiver device according to claim 5, wherein the RX byte clock signal is output at a gate-off level during the reception masking period.

7. The transceiver device according to claim 6, wherein an output of the reception data to the reception controller is held during the reception masking period.

8. The transceiver device according to claim 5, wherein the data receiver comprises a clock data restorer which generates the RX clock signal based on the clock training pattern and the first payload.

9. The transceiver device according to claim 3, wherein the transmitter masks a TX clock signal for transmission of the first payload during a transmission masking period.

10. The transceiver device according to claim 9, wherein the transmitter comprises:
a transmission controller which transmits the original payload based on the TX clock signal and generates a first transmission request signal in the second mode;
a data transmitter which generates the TX clock signal and transmits the clock training pattern and the first payload to the first line and the second line;
an encoder which encode the original payload provided from the transmission controller into the first payload including the encoding key, and transmits the clock training pattern to the data transmitter in response to the first transmission request signal;
a clock counter which counts the TX clock signal and generate a TX clock control signal in response to a preset count value; and
a clock controller which masks a portion of the TX clock signal based on the TX clock control signal and provides a modified TX clock signal, which is generated by masking the portion of the TX clock signal based on the TX clock control signal, to the transmission controller and the encoder.

11. The transceiver device according to claim 10, wherein
the modified TX clock signal is output at a gate-off level during the transmission masking period, and
an input of the original payload to the encoder is held during the transmission masking period.

12. The transceiver device according to claim 10, wherein
the original payload is provided to the encoder in synchronization with a gate-on level of the modified TX clock signal, and
the first payload is provided to the data transmitter in synchronization with the gate-on level of the TX clock signal.

13. The transceiver device according to claim 10, wherein in the second mode, the encoder further generates a start pattern transmitted between the clock training pattern and the first payload, and further generates an end pattern transmitted after the first payload.

14. The transceiver device according to claim 13, wherein the data transmitter sequentially transmits an HS-zero pattern and an HS-sync pattern before transmitting the clock training pattern, and sequentially transmits an HS-trail pattern and an HS-exit pattern after transmitting the end pattern.

15. A method of driving a transceiver device including a transmitter and a receiver connected to each other through a first line and a second line, the method comprising:
    transmitting signals having a first voltage range from the transmitter to the receiver in a first mode; and
    transmitting signals having a second voltage range, which is less than the first voltage range, from the transmitter to the receiver in a second mode,
    wherein the transmitting the signals having the second voltage range comprises:
    transmitting a clock training pattern from the transmitter to the receiver through the first line and the second line;
    generating a first payload by encoding an original payload using an encoder included in the transmitter, and transmitting the first payload from the transmitter to the receiver through the first line and the second line;
    generating an RX clock signal of the receiver based on the clock training pattern and the first payload; and
    providing reception data corresponding to the original payload by decoding the first payload using a decoder included in the receiver,
    wherein the providing the reception data comprises:
        inputting the first payload to the decoder in synchronization with each active level of a clock period of the RX clock signal, and
        outputting the reception data from the decoder in synchronization with each active level of a clock period of an RX byte clock signal, which is generated by masking a portion of the RX clock signal.

16. The method according to claim 15, wherein the transmitting the first payload comprises:
    counting a TX clock signal of the transmitter to mask a portion of the TX clock signal;
    inputting the original payload to the encoder based on a modified TX clock signal, which is generated by masking the portion of the TX clock signal;
    encoding the original payload into the first payload using an encoding key; and
    outputting the first payload from the encoder based on the TX clock signal.

17. The method according to claim 16, wherein the providing the reception data further comprises:
    generating an RX byte clock signal by counting the RX clock signal;
    decoding the first payload to generate the reception data; and
    outputting the reception data in synchronization with the RX byte clock signal.

18. The method according to claim 17, wherein
the RX byte clock signal is output at a gate-off level during a reception masking period, and
the modified TX clock signal is output at a gate-off level during a transmission masking period.

19. A display system comprising:
a processor which outputs image data;
a display module which displays an image based on the image data; and
a transceiver device which is in charge of data transmission and reception between the processor and the display module,
wherein the transceiver device comprises a transmitter and a receiver connected to each other through a first line and a second line,
the transmitter transmits signals having a first voltage range to the first line and the second line in a first mode, and transmits signals having a second voltage range less than the first voltage range to the first line and the second line in a second mode,
the transmitter encodes an original payload to generate a first payload in the second mode, and transmits a clock training pattern and the first payload through the first line and the second line,
the receiver comprises a decoder which decodes the first payload to output reception data corresponding to the original payload in the second mode,
the receiver generates an RX clock signal based on the clock training pattern and the first payload,
the first payload is input to the decoder in synchronization with each active level of a clock period of the RX clock signal, and
the reception data is output from the decoder in synchronization with each active level of a clock period of an RX byte clock signal, which is generated by masking a portion of the RX clock signal.

* * * * *